(12) United States Patent
Yamada et al.

(10) Patent No.: US 12,374,730 B2
(45) Date of Patent: Jul. 29, 2025

(54) WIRELESS RECHARGEABLE SOLID-STATE BATTERY MODULE AND WIRELESS POWER SUPPLY MODULE

(71) Applicant: Murata Manufacturing Co., Ltd., Kyoto-fu (JP)

(72) Inventors: Kiyokazu Yamada, Nagaokakyo (JP); Tatsuya Hosotani, Nagaokakyo (JP); Tomohiro Kato, Nagaokakyo (JP); Mitsuyoshi Nishide, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 664 days.

(21) Appl. No.: 17/716,315

(22) Filed: Apr. 8, 2022

(65) Prior Publication Data

US 2022/0231347 A1 Jul. 21, 2022

Related U.S. Application Data

(63) Continuation of application No. PCT/JP2020/035480, filed on Sep. 18, 2020.

(30) Foreign Application Priority Data

Oct. 11, 2019 (JP) ................................ 2019-188229

(51) Int. Cl.
*H01M 10/46* (2006.01)
*H01M 10/0525* (2010.01)
(Continued)

(52) U.S. Cl.
CPC ....... *H01M 10/46* (2013.01); *H01M 10/0525* (2013.01); *H01M 10/4257* (2013.01);
(Continued)

(58) Field of Classification Search
CPC ............... H02J 7/00304; H02J 7/00308; H02J 7/00309; H02J 7/0068; H02J 50/10;
(Continued)

(56) References Cited

U.S. PATENT DOCUMENTS

| 7,855,528 | B2 * | 12/2010 | Lee ........................ | H02J 7/0042 |
| | | | | 320/113 |
| 2012/0319487 | A1 * | 12/2012 | Shah ........................ | H02J 7/342 |
| | | | | 307/66 |

(Continued)

FOREIGN PATENT DOCUMENTS

| JP | 2004-146297 A | 5/2004 |
| JP | 2005-176551 A | 6/2005 |

(Continued)

OTHER PUBLICATIONS

International Search Report issued in PCT/JP2020/035480; mailed Nov. 17, 2020.

*Primary Examiner* — Edward Tso
(74) *Attorney, Agent, or Firm* — Studebaker Brackett PLLC

(57) ABSTRACT

A wireless rechargeable solid-state battery module includes a solid-state battery; an internal structure including an internal circuit electrically connected with the battery; positive and negative electrode terminals, each of which is electrically connected with the solid-state battery, is exposed on an outer surface, and is where the positive or negative electrode terminal can be mounted on an electronic circuit board; barrier layers that entirely or partially contain a conductor and isolate the battery and the internal structure from an outside air environment; and a power receiving terminal electrically connected with an external circuit, which includes a power receiving coil coupled with an external electromagnetic or magnetic field, is electrically connected with the internal circuit, and is in an outside of the (Continued)

barrier layers. The power receiving coil converts the external electromagnetic or magnetic field into electrical energy and supplies current to the internal circuit via the power receiving terminal.

23 Claims, 18 Drawing Sheets

(51) Int. Cl.
| | |
|---|---|
| *H01M 10/42* | (2006.01) |
| *H01M 10/48* | (2006.01) |
| *H01M 50/124* | (2021.01) |
| *H01M 50/14* | (2021.01) |
| *H02J 7/00* | (2006.01) |
| *H02J 50/10* | (2016.01) |

(52) U.S. Cl.
CPC ....... *H01M 10/4264* (2013.01); *H01M 10/48* (2013.01); *H01M 50/1243* (2021.01); *H01M 50/14* (2021.01); *H02J 7/00304* (2020.01); *H02J 7/00308* (2020.01); *H02J 7/00309* (2020.01); *H02J 7/0068* (2013.01); *H02J 50/10* (2016.02); *H01M 2010/4271* (2013.01)

(58) Field of Classification Search
CPC ............. H01M 10/46; H01M 10/4257; H01M 10/0525; H01M 2010/4271
USPC .................. 320/107, 112, 132, 150, 152, 162
See application file for complete search history.

(56) References Cited

U.S. PATENT DOCUMENTS

| | | | | |
|---|---|---|---|---|
| 2016/0013680 | A1* | 1/2016 | Liang | ........................ H02J 7/00 |
| | | | | 320/108 |
| 2019/0372157 | A1* | 12/2019 | Oura | ................. H01M 10/0525 |

FOREIGN PATENT DOCUMENTS

| | | | |
|---|---|---|---|
| JP | 2010-029006 | A | 2/2010 |
| JP | 2013-165584 | A | 8/2013 |
| JP | 2015-088376 | A | 5/2015 |
| JP | 5798407 | B2 | 10/2015 |
| JP | 2017-032975 | A | 2/2017 |
| JP | 2019-507564 | A | 3/2019 |
| JP | 2019-110760 | A | 7/2019 |
| WO | WO-2019061031 | A1 * | 4/2019 |
| WO | 2019/164006 | A1 | 8/2019 |

* cited by examiner

WIRELESS RECHARGEABLE SOLID-STATE BATTERY MODULE AND WIRELESS POWER SUPPLY MODULE

CROSS-REFERENCE TO RELATED APPLICATIONS

This application claims benefit of priority to International Patent Application No. PCT/JP2020/035480, filed Sep. 18, 2020, and to Japanese Patent Application No. 2019-188229, filed Oct. 11, 2019, the entire contents of each are incorporated herein by reference.

BACKGROUND

Technical Field

The present disclosure relates to a module including a solid-state battery that is wirelessly charged.

Background Art

Japanese Patent No. 5798407 discloses a non-contact charging type secondary battery in which a secondary battery and a wireless power transmission circuit are provided in a casing. In specific, the non-contact charging type secondary battery includes: an alkaline secondary battery; a power receiving circuit including power receiving coils and a resonant capacitor connected to the power receiving coils in parallel and receiving alternate current power via a magnetic field from a power transmission device; a rectifier circuit for rectifying alternate current power received by the power receiving circuit; a current limit circuit for limiting a charging current from the rectifier circuit to the alkaline secondary battery; and an external body having a columnar shape and containing a positive electrode terminal and a negative electrode terminal that are connected to the alkaline secondary battery. Japanese Patent No. 5798407 describes the configuration in which the power receiving coils are provided along an inner circumferential surface of the external body.

SUMMARY

The non-contact charging type secondary battery described in Japanese Patent No. 5798407 is assumed to be an alkaline secondary battery that has a cylindrical casing and is substitutable for a dry cell battery. Such a non-contact charging type secondary battery cannot be downsized and is hard to be mounted on a small device such as a wearable device.

Batteries are used in various environments and the batteries are generally required to exhibit high waterproofness. Meanwhile, in configuring a wireless rechargeable solid-state battery module, it is required to secure a coupling degree of electromagnetic field coupling or magnetic field coupling between a power transmission coil and a power receiving coil on a power transmission device side. However, a barrier layer that is formed to secure high waterproofness blocks the electromagnetic field coupling or the magnetic field coupling. Thus, it is difficult to achieve waterproofness and easiness of charging at the same time.

For this reason, the present disclosure provides a downsized wireless rechargeable solid-state battery module and a wireless power supply module with the wireless rechargeable solid-state battery module that are capable of protecting a solid-state battery from moisture, dust, heat, and the like in the air, exhibit high waterproofness, and are capable of performing wireless charging with ease.

A wireless rechargeable solid-state battery module as an example of the present disclosure includes a solid-state battery; an internal structure that is provided with an internal circuit electrically connected with the solid-state battery; and a positive electrode terminal and a negative electrode terminal each of which is electrically connected with the solid-state battery, is exposed on an outer surface, and is arranged on a position where the positive electrode terminal or the negative electrode terminal can be mounted on an electronic circuit board. The wireless rechargeable solid-state battery module further includes a barrier layer that entirely or partially contains a conductor and isolates the solid-state battery and the internal structure from an outside air environment; and a power receiving terminal that is electrically connected with an external circuit, which includes a power receiving coil coupled with an external electromagnetic or magnetic field, is electrically connected with the internal circuit, and is provided in an outside of the barrier layer. The power receiving coil converts the external electromagnetic or magnetic field into electrical energy and supplies current to the internal circuit via the power receiving terminal, and the internal circuit includes a charging circuit that charges the solid-state battery and a discharging circuit that discharges to a load to which the positive electrode terminal and the negative electrode terminal are connected.

A wireless power supply module of the present disclosure is composed of the wireless rechargeable solid-state battery module and the external circuit that is connected with the power receiving terminal.

According to the present disclosure, the power receiving coil is arranged in the outside of the barrier layer that isolates the solid-state battery and the internal structure from the outside air environment. Accordingly, the power receiving coil can receive power while the conductive material used for the barrier layer exerts an effect of a shielding action of an electromagnetic field. Thus, a down-sized wireless rechargeable solid-state battery module and a wireless power supply module that are capable of protecting a solid-state battery from moisture, dust, heat, and the like in the air, exhibit high waterproofness, and are capable of performing wireless charging with ease can be obtained.

The wireless rechargeable solid-state battery module according to the present disclosure can receive power from the outside via an electromagnetic field or a magnetic field produced by power transmission from the outside, only by providing a power receiving coil on an electronic circuit board on which the wireless rechargeable solid-state battery module is to be mounted. This eliminates a need for configuring a charging circuit on the electronic circuit board. Further, the solid-state battery and the charging circuit can be mutually connected with short wiring, being able to reduce power loss in wiring and suppress malfunction caused by an external magnetic field. Furthermore, this configuration can reduce the size, weight, and thickness of the electronic circuit board on which the wireless rechargeable solid-state battery module is to be mounted and enhance the efficiency of the electronic circuit board. Also, the electronic circuit board itself can be used as a mounting electronic circuit board with a wireless rechargeable solid-state battery, being able to achieve reduction in size and weight of electronic and electrical devices and enhance efficiency of the same.

DETAILED DESCRIPTION

Figure 1:
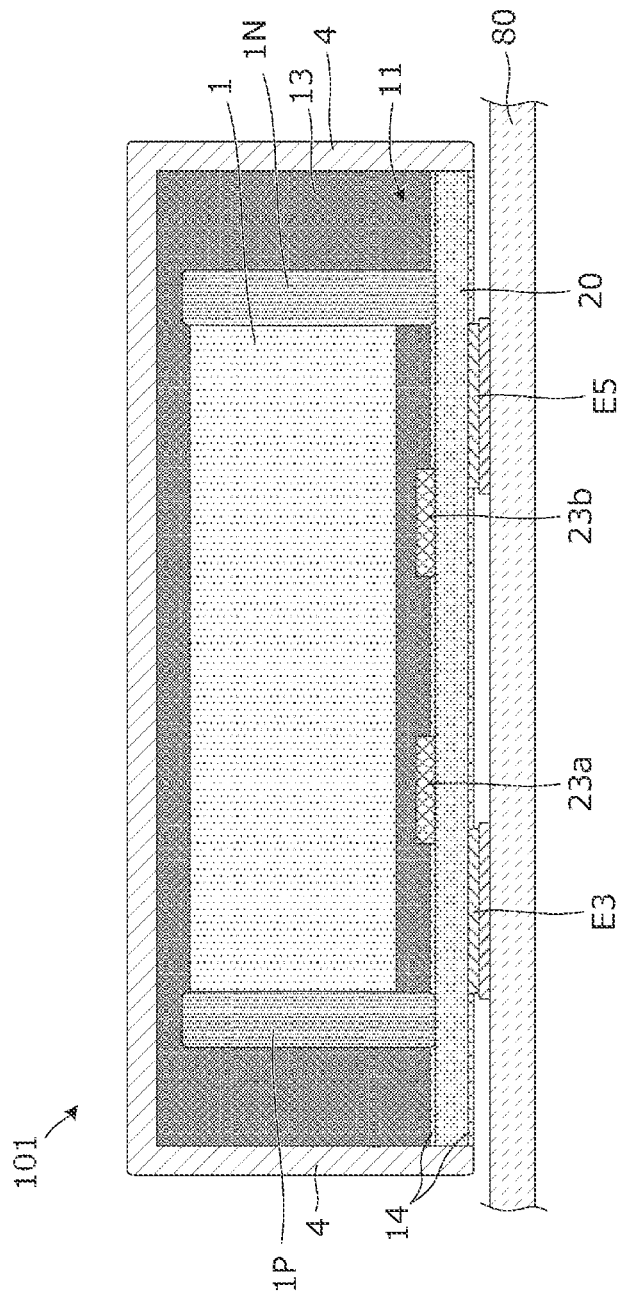
FIG. 1 is a sectional view of a wireless rechargeable solid-state battery module according to a first embodiment.

Hereinafter, a plurality of embodiments for carrying out the present disclosure will be described with some specific examples referring to the accompanying drawings. The same reference characters are given to the same components among the drawings. For convenience of explanation of the embodiments, description will be provided separately in a plurality of embodiments so as to focus on explaining main points or facilitating understanding, but it is possible to make partial replacement or combination of configurations described in different embodiments. The second and following embodiments will omit the description of matters common to those of the first embodiment and describe only different points. In particular, the same advantageous effects[ obtained with the same configurations will not be sequentially mentioned in each embodiment.

First Embodiment

FIG. 1 is a sectional view of a wireless rechargeable solid-state battery module 101 according to a first embodiment. The wireless rechargeable solid-state battery module 101 includes a solid-state battery 1, an internal structure 11, a first barrier layer 4, second barrier layers 14, a positive electrode terminal E3, and a negative electrode terminal E5. The first barrier layer 4 and the second barrier layers 14 isolate the solid-state battery 1 from the outside air environment. Each of the positive electrode terminal E3 and the negative electrode terminal E5 is electrically connected with the solid-state battery 1 and is exposed on an outer surface of the wireless rechargeable solid-state battery module 101.

The internal structure 11 includes a circuit board 20, a plurality of electronic components 23a and 23b mounted on the circuit board 20, and a mold resin portion 13 that molds the periphery of the solid-state battery 1. The internal structure 11 is overlapped with the solid-state battery 1 when viewed in a laminating direction of the internal structure 11 and the solid-state battery 1. The circuit board 20 is provided with an internal circuit which is electrically connected with the solid-state battery 1. On the both surfaces of the circuit board 20, the second barrier layers 14 are provided.

The positive electrode terminal E3 and the negative electrode terminal E5 are arranged on positions where the positive electrode terminal E3 and the negative electrode terminal E5 can be mounted on an electronic circuit board 80 together with other terminals. That is, the positive electrode terminal E3 and the negative electrode terminal E5 are arranged on a surface (lower surface) facing the electronic circuit board 80. On the electronic circuit board 80, a circuit using the wireless rechargeable solid-state battery module 101 as a power supply module is configured.

The internal circuit mentioned above includes a charging circuit that receives power from the outside via a power receiving coil and a power transmission magnetic field so as to charge the solid-state battery 1.

The solid-state battery 1 is a battery which has a rectangular parallelepiped outer shape, and in the direction shown in FIG. 1, a positive electrode 1P and a negative electrode 1N are respectively formed on the left side surface and the right side surface. The periphery of the solid-state battery 1 is sealed with the mold resin portion 13 in a state in which the solid-state battery 1 is mounted on the circuit board 20. The mold resin portion 13 is made of polyimide, for example, and enhances impact resistance of the solid-state battery 1. The mold resin portion 13 corresponds to an "impact absorbing member" according to the present disclosure.

The circuit board 20 is a low temperature co-fired ceramic (LTCC) board, for example. Alternatively, a high temperature co-fired ceramic (HTCC) board may be employed. As merely an example, the thickness of the circuit board 20 may be from 20 µm to 1000 µm inclusive and is, for example, from 100 µm to 300 µm inclusive.

The electronic components 23a and 23b and the like are mounted on the circuit board 20 and the internal circuit is configured on the circuit board 20. The internal circuit includes a rectifier circuit 52, a DC-DC converter 54, a charge control circuit 55, and the like which will be described later with reference to FIG. 5.

On the top surface and lateral surfaces of the wireless rechargeable solid-state battery module 101, the first barrier layer 4 is formed in a film coating manner. This first barrier layer 4 exhibits excellent waterproofness. The first barrier layer 4 and the second barrier layers 14 protect the inside of the wireless rechargeable solid-state battery module 101 with their high waterproof performance.

Thus, the mold resin portion 13 is provided to cover the solid-state battery 1 and the first barrier layer 4 is provided on the mold resin portion 13, notably effectively improving characteristics of preventing water vapor permeation.

The mold resin portion 13 can be made of any kind of material as long as the material has an insulation property. For example, resin of the mold resin portion 13 may be either of thermosetting resin or thermoplastic resin. Not especially limited, specific examples of a resin material of the mold resin portion 13 can include epoxy resin, silicone resin, and liquid crystal polymer. As merely an example, the thickness of the mold resin portion 13 may be from 30 µm to 1000 µm inclusive and is, for example, from 50 µm to 300 µm inclusive.

The first barrier layer 4 is preferably formed to cover the mold resin portion 13. In this configuration, the first barrier layer 4 is positioned on the mold resin portion 13 and thus broadly encloses the whole of the solid-state battery 1 provided on the circuit board 20 together with the mold resin portion 13.

The first barrier layer 4 preferably has a thin film shape. The material of the first barrier layer 4 is not especially limited as long as the material contributes an inorganic layer having a thin film shape. The material may be any of metal, glass, oxide ceramics, and a mixture of these. In a favorable aspect, the first barrier layer 4 contains a metal component. That is, the first barrier layer 4 is preferably a metal thin film. As merely an example, the thickness of the first barrier layer 4 may be from 0.1 µm to 100 µm inclusive and is, for example, from 1 µm to 50 µm inclusive.

In terms of a manufacturing method, the first barrier layer 4 may be a dry plated film. The dry plated film is a film obtained by a gas phase method such as physical vapor deposition (PVD) and chemical vapor deposition (CVD) and has a nano-order or micron-order thickness. Such a thin dry plated film contributes to more compact packaging. The dry plated film may be made of at least one metal or metalloid component selected from the group consisting of aluminum (Al), nickel (Ni), palladium (Pd), silver (Ag), tin (Sn), gold (Au), copper (Cu), titanium (Ti), platinum (Pt), silicon (Si), and SUS; inorganic oxide; and/or a glass component, for example. A dry plated film made of these kinds of components is chemically and/or thermally stable, being able to provide a solid-state battery that is excellent in chemical resistance, weather resistance, and/or heat resistance and exhibits enhanced long-term reliability.

The first barrier layer 4 may be made of a metal sealing material. Examples of the metal sealing material include various kinds of brazing material such as silver brazing, copper brazing, brass brazing, phosphor copper brazing, aluminum brazing, and gold brazing. Here, silver brazing is brazing containing silver, copper, and zinc as main components, and a nickel added material can be also employed.

Further, part of the first barrier layer 4 may have conductivity. Also, a film may be employed that is composed of a coating film of a nitride film or an oxide film or a conductor film formed on the coating film, for example.

Since the first barrier layer 4 composed of a metal thin film surrounds the solid-state battery 1, the first barrier layer 4 can suppress eddy current generated in a conductor portion of the solid-state battery 1 when receiving a magnetic field from a power transmission coil.

Here, a buffer layer may be interposed between the first barrier layer 4 and the internal structure 11. This buffer layer can enhance the effect of suppressing peeling of the first barrier layer 4 from the mold resin portion 13. In a similar manner, a buffer layer may be interposed between the second barrier layer 14 and the circuit board 20. This buffer layer can enhance the effect of suppressing peeling of the second barrier layer 14 from the circuit board 20.

The second barrier layer 14 is made of a resin material, for example. This resin material may be either of a thermosetting resin material or a thermoplastic resin material. Not especially limited, epoxy resin, silicone resin, and liquid crystal polymer, for example, can be employed in a similar manner to the mold resin portion 13.

Thus, the wireless rechargeable solid-state battery module 101 includes the solid-state battery 1 with the circuits thereof in one package, having a feature on the point of preventing water vapor permeation as well. Namely, in the wireless rechargeable solid-state battery module 101, at least the mold resin portion 13, the first barrier layer 4, and the second barrier layer 14, which cover the solid-state battery 1 on the circuit board 20, more securely prevent degradation in battery characteristics caused by water vapor (more specifically, a phenomenon in which water vapor of an external environment permeates and deteriorates characteristics of the solid-state battery).

Preferably, the first barrier layer 4 is a water vapor barrier film. That is, the first barrier layer 4 covers the periphery of the solid-state battery 1 so that the first barrier layer 4 favorably works as a barrier blocking moisture infiltration into the solid-state battery 1. The "barrier" in the present specification means, in a broad sense, having characteristics of blocking water vapor permeation to the extent that water vapor in the external environment does not pass through the first barrier layer 4 and cause characteristic-deterioration that is unwanted for the solid-state battery 1, and, in a narrow sense, having water vapor permeability lower than $1.0 \times 10^{-3}$ g/(m$^2 \cdot$Day). Accordingly, to put it simply, it can be said that the water vapor barrier film preferably has the water vapor permeability that is 0 or greater and lower than $1.0 \times 10^{-3}$ g/(m$^2 \cdot$Day). The "water vapor permeability" here indicates permeability obtained in the measurement condition of 40° C., 90% RH, and differential pressure 1 atm with the use of the gas transmission rate measurement system GTms-1 series made by ADVANCE RIKO, Inc.

The mold resin portion 13 and the first barrier layer 4 may be integrated with each other. Accordingly, the first barrier layer 4 serves as a water vapor barrier for the solid-state battery 1 together with the mold resin portion 13. That is, the combination obtained by integrating the mold resin portion 13 and the first barrier layer 4 with each other more favorably prevents water vapor of the external environment from infiltrating into the solid-state battery 1.

In the present embodiment, the circuit board 20 and the second barrier layer 14 that support the solid-state battery 1 are positioned to cover the lower side (bottom side) of the solid-state battery 1, contributing to prevention against water vapor permeation from the lower side (bottom side). That is, the circuit board 20 and the second barrier layer 14 are preferably water vapor barrier members. The "barrier" here also has a similar meaning as the description above and means having characteristics of blocking water vapor permeation to the extent that water vapor in the external environment does not pass through the first barrier layer 4 and cause characteristic-deterioration that is unwanted for the solid-state battery 1, and, in a narrow sense, having water vapor permeability lower than $1.0 \times 10^{-3}$ g/(m². Day). Accordingly, the circuit board 20 and the second barrier layer 14 preferably have water vapor permeability that is 0 or greater and lower than $1.0 \times 10^{-3}$ g/(m²·Day). When the circuit board 20 and the second barrier layer 14 thus serve as the water vapor barrier members, the circuit board 20 and the second barrier layer 14 exerts barrier effects. Therefore, the first barrier layer 4 does not have to be provided on the bottom surface side of the circuit board 20 and the second barrier layer 14. In other words, the first barrier layer 4 is provided to broadly enclose the solid-state battery 1, but the first barrier layer 4 does not especially need to be provided to part (specifically, bottom surface) of the circuit board 20 and the second barrier layer 14 (that is, in a favorable aspect, the first barrier layer 4 is provided to most surfaces of battery package product, but the first barrier layer 4 is not provided to all surfaces).

When the circuit board 20 is a ceramic board, the circuit board 20 more easily exerts the preventing effect against water vapor permeation. When the circuit board 20 has water vapor barrier characteristics, the circuit board 20 and the second barrier layer 14 can mainly prevent water vapor permeation from the lower side (bottom side) of the solid-state battery 1 while the mold resin portion 13 and the first barrier layer 4 mainly prevent water vapor permeation from the upper side and the lateral sides of the solid-state battery 1.

From another perspective, as can be seen from the aspect illustrated in FIG. 1, the peripheries of the electrodes 1P and 1N of the solid-state battery 1 are surrounded by the combination of the mold resin portion 13, the first barrier layer 4, the second barrier layer 14, and the circuit board 20. Namely, it can be said that the peripheries of the electrodes 1P and 1N of the solid-state battery 1 are sealed in a manner to be enclosed by the combination of those members. Accordingly, the configuration more securely prevents the possibility that water vapor of the external environment infiltrates from the electrodes 1P and 1N of the solid-state battery 1. Such sealing can be especially advantageous when the electrodes 1P and 1N of the solid-state battery 1 are made of sintered metal. This is because pores, defects, or the like may be generated in such the electrodes 1P and 1N depending on a material, a shape, a manufacturing process, and the like and permeation of water vapor in the air is not always sufficiently prevented.

Even when the circuit board 20 is a resin board, the circuit board 20 can be a water vapor barrier board. For example, the preventing effect against water vapor permeation of the board can be enhanced by providing a metal layer (a metal foil such as a copper foil, which is merely an example) to the resin board. The provision of the second barrier layer 14 can make the resin board more favorable as a water vapor barrier board of a battery package product.

In the present disclosure, the solid-state battery 1 on the circuit board 20 is covered by the first barrier layer 4 with the mold resin portion 13 interposed therebetween. Therefore, the mold resin portion 13 also serves as a buffer member. Specifically, even when expansion and contraction of the solid-state battery 1 occur due to charge/discharge and thermal expansion, the first barrier layer 4 is not directly influenced by the expansion and contraction. Thus, the interposed mold resin portion 13 can reduce the influence with its buffer effect. Accordingly, an occurrence of cracks and the like is suppressed even in a thin film such as the first barrier layer 4 and thus, more favorable water vapor barrier can be provided. This is especially true when the mold resin portion 13 contains a resin material, and the mold resin portion 13 made of a resin material exhibits a higher buffer effect.

The mold resin portion 13 may have an elastic modulus at which the influence of the above-mentioned expansion and contraction of the solid-state battery 1 is more effectively suppressed. That is, the mold resin portion 13 having a relatively low elastic modulus may be provided so as to reduce an occurrence of cracks and the like caused by the expansion and contraction of the solid-state battery 1. For example, the elastic modulus of the mold resin portion 13 may be 1 MPa or lower, more specifically, may be 0.5 MPa or lower or may be 0.1 MPa or lower. The lower limit value of the elastic modulus is not especially limited and is, for example, 10 Pa. The "elastic modulus" here indicates so-called Young's modulus [Pa], and a value of the elastic modulus means a value that is obtained by a method based on JIS standards (JIS K 7161 and JIS K 7181, for example).

Here, the mold resin portion 13 does not have to be limitedly formed in the shape illustrated in FIG. 1 but may be formed to reach the lateral surface of the circuit board 20. In other words, the mold resin portion 13 covering the solid-state battery 1 may cover the lateral surfaces of the circuit board 20. This configuration makes it possible to avoid unwanted peeling of the mold resin portion 13 caused by the expansion and contraction of the solid-state battery 1. A case where the expansion and contraction of the solid-state battery 1 (especially, expansion and contraction in a laminating direction of the solid-state battery 1) become excessive in the configuration illustrated in FIG. 1 easily produces a phenomenon in which the mold resin portion 13 peels off from the circuit board 20 from a bonding interface between the mold resin portion 13 and the main surface of the circuit board 20 (especially, a bonding interface forming the outermost edge along a direction orthogonal to the laminating direction) as a starting point. However, in the above-mentioned configuration in which the mold resin portion 13 reaches the lateral surfaces of the circuit board 20, the possibility of the peeling is reduced. This is because the mold resin portion 13 does not form a bonding surface, forming the outermost edge, with the main surface of the circuit board 20 and therefore, the mold resin portion 13 is less likely to be affected by the unwanted influence of the expansion and contraction in the laminating direction of the solid-state battery 1.

In terms of peeling, the first barrier layer 4 may be also configured to be less likely to peel off from the circuit board 20. For example, the first barrier layer 4 may further extends from the lateral surface of the circuit board 20 to the lower-side main surface of the circuit board 20. This configuration relatively increases the bonding area between the first barrier layer 4 and the circuit board 20 and accordingly makes the first barrier layer 4 more resistant to peeling. When the circuit board 20 is made of ceramic or the like, a metal pad may be interposed so as to more strongly bond the first barrier layer 4 and the circuit board 20 to each other. For example, a metal pad may be provided on the circuit board 20 and the first barrier layer 4 may be provided to reach the metal pad. Such a metal pad may be provided on a peripheral edge of a back side main surface (namely, a bottom side main surface) of the circuit board 20, for example.

Furthermore, the mold resin portion 13 and the first barrier layer 4 may be configured in a manner such that the mold resin portion 13 covers the lateral surface of the circuit board 20 and the first barrier layer 4 extends to the lower side main surface of the circuit board 20. That is, the mold resin portion 13 covering the solid-state battery 1 may extend to the lateral surface of the circuit board 20 and the first barrier layer 4 provided on the mold resin portion 13 may extend to the lower side main surface of the circuit board 20 over the lateral side of the circuit board 20. This configuration can provide the wireless rechargeable solid-state battery module 101 in which moisture permeation (moisture permeation from the outside to the solid-state battery 1) is more favorably prevented.

In the wireless rechargeable solid-state battery module 101 according to the present embodiment, water vapor permeation is prevented but the members contributing to the prevention against the water vapor permeation are the first barrier layer 4 integrated with the mold resin portion 13, the second barrier layer 14, and the circuit board 20, whereby the package size is not unfavorably increased. That is, the wireless rechargeable solid-state battery module 101 can be provided that has the compact size but achieves prevention of water vapor permeation.

The positive electrode terminal E3 and the negative electrode terminal E5 that are formed on the outer surface (lower surface) of the circuit board 20 are connected to a pad electrode, which is formed on the electronic circuit board 80, via solder or the like. The wireless rechargeable solid-state battery module 101 is thus surface-mounted on the electronic circuit board 80.

The "solid-state battery" in the present disclosure indicates a battery whose components are made of solids in a broad sense, and indicates an all-solid-state battery whose components (especially preferably all components) are made of solids in a narrow sense. In a favorable aspect, the solid-state battery of the present disclosure is a laminate type solid-state battery configured so that layers serving as battery constituting units are mutually laminated, and each of the layers is preferably made of a sintered body.

Figure 2:
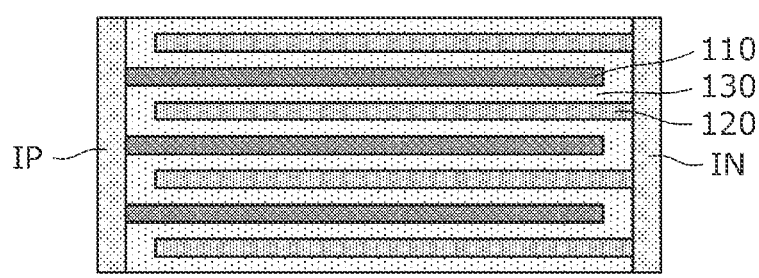
FIG. 2 is a sectional view illustrating a basic configuration of a solid-state battery according to the first embodiment.

FIG. 2 is a sectional view illustrating a basic configuration of the solid-state battery 1 according to the present embodiment. The configuration of the solid-state battery described here is merely an example for facilitating understanding of the disclosure and does not limit the disclosure.

[Basic Configuration of Solid-State Battery]

As illustrated in FIG. 2, the solid-state battery 1 has a solid-state battery multilayer body in which a plurality of battery constituting units, each of which includes a positive electrode layer 110, a negative electrode layer 120, and solid electrolyte 130, are laminated.

The layers constituting the solid-state battery 1 are formed by firing and the solid-state battery 1 includes sintered layers such as the positive electrode layer 110, the negative electrode layer 120, and the solid electrolyte 130. The positive electrode layer 110, the negative electrode layer 120, and the solid electrolyte 130 are preferably integrally fired.

The positive electrode layer 110 is an electrode layer containing at least a positive electrode active material. The positive electrode layer 110 may further contain solid electrolyte. In a favorable aspect, the positive electrode layer 110 is composed of a sintered body that contains at least positive electrode active material particles and solid electrolyte particles. On the other hand, the negative electrode layer 120 is an electrode layer containing at least a negative electrode active material. The negative electrode layer 120 may further contain solid electrolyte. In a favorable aspect, the negative electrode layer 120 is composed of a sintered body that contains at least negative electrode active material particles and solid electrolyte particles.

The positive electrode active material and the negative electrode active material are substances involved in electron transfer in the solid-state battery. The electron transfer is performed in a manner such that ions move (conduct) between the positive electrode layer 110 and the negative electrode layer 120 via the solid electrolyte 130. Charge/discharge is thus performed. The positive electrode layer 110 and the negative electrode layer 120 are preferably layers that can occlude and release especially lithium ions. That is, the solid-state battery is preferably an all-solid-state secondary battery in which lithium ions move between the positive electrode layer 110 and the negative electrode layer 120 via the solid electrolyte 130 to perform charge/discharge of the battery.

<Positive Electrode Active Material>

The positive electrode active material contained in the positive electrode layer 110 is at least one selected from the group consisting of a lithium-containing phosphoric acid compound having a nasicon-type structure, a lithium-containing phosphoric acid compound having an olivine-type structure, lithium-containing layered oxide, lithium-containing oxide having a spinel-type structure, and the like, for example Examples of the lithium-containing phosphoric acid compound having a nasicon-type structure include $Li_3V_2(PO_4)_3$. Examples of the lithium-containing phosphoric acid compound having an olivine-type structure include $Li_3Fe_2(PO_4)_3$, $LiFePO_4$, and $LiMnPO_4$. Examples of the lithium-containing layered oxide include $LiCoO_2$ and $LiCo_{1/3}Ni_{1/3}Mn_{1/3}O_2$. Examples of the lithium-containing oxide having a spinel-type structure include $LiMn_2O_4$ and $LiNi_{0.5}Mn_{1.5}O_4$.

<Negative Electrode Active Material>

The negative electrode active material contained in the negative electrode layer 120 is at least one selected from the group consisting of oxide containing at least one element selected from the group consisting of Ti, Si, Sn, Cr, Fe, Nb, and Mo, a graphite-lithium compound, a lithium alloy, a lithium-containing phosphoric acid compound having a nasicon-type structure, a lithium-containing phosphoric acid compound having an olivine-type structure, lithium-containing oxide having a spinel-type structure, and the like, for example. Examples of the lithium alloy include Li—Al. Examples of the lithium-containing phosphoric acid compound having a nasicon-type structure include $Li_3V_2(PO_4)_3$ and $LiTi_2(PO_4)_3$. Examples of the lithium-containing phosphoric acid compound having an olivine-type structure include $Li_3Fe_2(PO_4)_3$ and $LiCuPO_4$. Examples of the lithium-containing oxide having a spinel-type structure include $Li_4Ti_5O_{12}$.

One or both of the positive electrode layer 110 and the negative electrode layer 120 may contain a conductive aid. The conductive aid contained in the positive electrode layer 110 and the negative electrode layer 120 can be at least one material that contains: a metal material such as silver, palladium, gold, platinum, aluminum, copper, and nickel; carbon; and the like. Not especially limited, copper is favorable on the point that copper does not easily react with the positive electrode active material, the negative electrode active material, the solid electrolyte material, and the like and is effective in reducing internal resistance of the solid-state battery.

Further, one or both of the positive electrode layer 110 and the negative electrode layer 120 may contain a sintering aid. The sintering aid can be at least one selected from the group consisting of lithium oxide, sodium oxide, potassium oxide, boron oxide, silicon oxide, bismuth oxide, and phosphorus oxide.

<Solid Electrolyte>

The solid electrolyte 130 is a material that can conduct lithium ions. Especially, the solid electrolyte 130 serving as a battery constituting unit in the solid-state battery is a layer that can conduct lithium ions between the positive electrode layer 110 and the negative electrode layer 120. Specific examples of the solid electrolyte 130 include lithium-containing phosphoric acid compound having a nasicon structure, oxide having a perovskite structure, and oxide having a garnet-type or a garnet-type-like structure. Examples of the lithium-containing phosphoric acid compound having a nasicon structure include $Li_xM_y(PO_4)_3$ ($1 \le x \le 2$, $1 \le y \le 2$, M is at least one selected from the group consisting of Ti, Ge, Al, Ga, and Zr). Examples of the lithium-containing phosphoric acid compound having a nasicon structure include $Li_{1.2}Al_{0.2}Ti_{1.8}(PO_4)_3$. Examples of the oxide having a perovskite structure include $La_{0.55}Li_{0.35}TiO_3$. Examples of the oxide having a garnet-type or a garnet-type-like structure include $Li_7La_3Zr_2O_{12}$.

The solid electrolyte 130 may contain a sintering aid. The sintering aid contained in the solid electrolyte 130 may be selected from the same materials as those of sintering aids that can be contained in the positive electrode layer 110 and the negative electrode layer 120, for example.

<Positive Electrode Current Collector Layer and Negative Electrode Current Collector Layer>

The positive electrode layer 110 and the negative electrode layer 120 may respectively include a positive electrode current collector layer and a negative electrode current collector layer. Each of the positive electrode current collector layer and the negative electrode current collector layer may have a foil shape. However, from the viewpoints of reduction in manufacturing cost of a solid-state battery through integral firing and reduction in internal resistance of the solid-state battery, the positive electrode current collector layer and the negative electrode current collector layer may have a shape of a sintered body. When the positive electrode current collector layer and the negative electrode current collector layer have the shape of a sintered body, the positive electrode current collector layer and the negative electrode current collector layer may be composed of a sintered body containing a conductive aid and a sintering aid. The conductive aid contained in the positive electrode current collector layer and the negative electrode current collector layer may be selected from the same materials as those of conductive aids that can be contained in the positive electrode layer 110 and the negative electrode layer 120, for example. The sintering aid contained in the positive electrode current collector layer and the negative electrode current collector layer may be selected from the same materials as those of sintering aids that can be contained in the positive electrode layer 110 and the negative electrode layer 120, for example. Here, the positive electrode current collector layer and the negative electrode current collector layer are not essential components for the solid-state battery.

<End Surface Electrode>

The solid-state battery 1 is provided with an end surface electrode serving as the positive electrode 1P and an end surface electrode serving as the negative electrode 1N. These end surface electrodes preferably contain a material with high conductivity. Not especially limited, a specific material of the end surface electrode can be at least one selected from the group consisting of silver, gold, platinum, aluminum, copper, tin, and nickel.

Figure 3A:
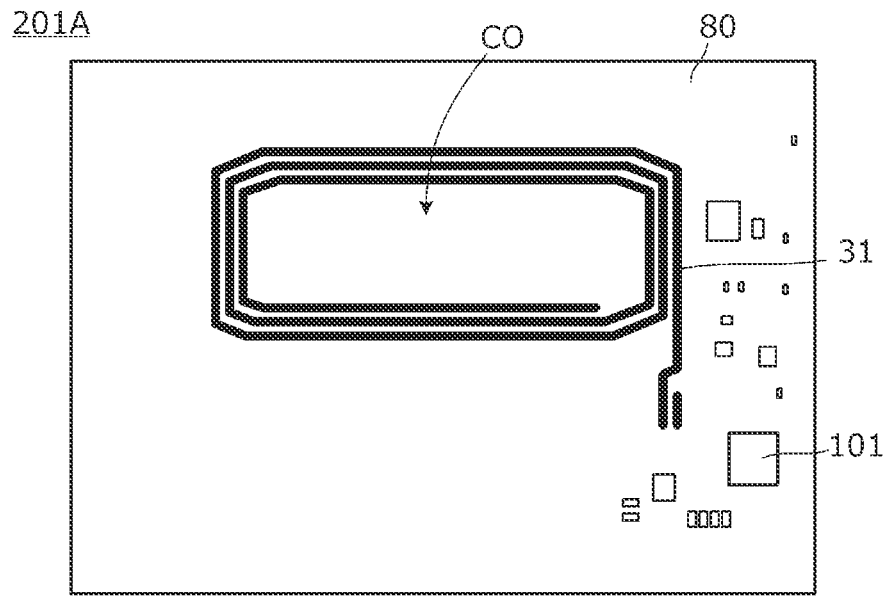
FIGS. 3A, 3B, and 3C are plan views illustrating configuration examples of a wireless power supply module composed of an external circuit, including a power receiving coil, and the wireless rechargeable solid-state battery module.
Figure 3B:
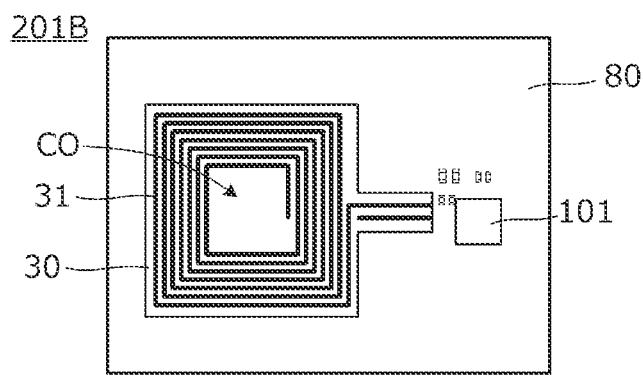
Figure 3C:
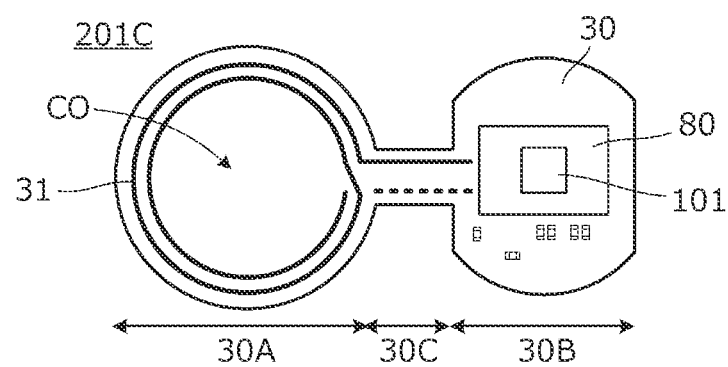

FIGS. 3A, 3B, and 3C are plan views illustrating configuration examples of a wireless power supply module composed of an external circuit, including a power receiving coil, and the wireless rechargeable solid-state battery module 101.

In the example of a wireless power supply module 201A illustrated in FIG. 3A, a power receiving coil 31 which is a conductor pattern is formed on the electronic circuit board 80 and the wireless rechargeable solid-state battery module 101 is mounted on the electronic circuit board 80. The power receiving coil 31 is connected to the wireless rechargeable solid-state battery module 101 in this state.

The power receiving coil 31 is wound multiple times to have a square spiral shape, and a coil opening CO is formed on the center. Ends of the power receiving coil 31 are connected to connection pads of power receiving terminals E4 and E7 of the wireless rechargeable solid-state battery module 101. A power transmission coil having a spiral shape is also formed on a power transmission device, and the power receiving coil 31 and the power transmission coil are mutually coupled via an electromagnetic field or a magnetic field.

In the example of a wireless power supply module 201B illustrated in FIG. 3B, a coil forming board 30 is mounted on the electronic circuit board 80 together with the wireless rechargeable solid-state battery module 101. The coil forming board 30 is, for example, a flexible board, and the power receiving coil 31 provided as a conductive pattern is formed on the coil forming board 30. In this configuration, the power receiving coil 31 is connected with the wireless rechargeable solid-state battery module 101.

In the example of a wireless power supply module 201C illustrated in FIG. 3C, the wireless power supply module 201C includes the electronic circuit board 80, on which the wireless rechargeable solid-state battery module 101 is mounted, and the coil forming board 30 on which the power receiving coil 31 is formed and which is a flexible board.

In this example, the coil forming board 30 is composed of three regions that are a first region 30A, a second region 30B, and a third region 30C. In the first region 30A, the power receiving coil 31 having a circular spiral shape is formed. In the second region 30B, a predetermined circuit is formed and the electronic circuit board 80 is mounted. The third region 30C is a region coupling the first region 30A and the second region 30B with each other. The third region 30C is bent as necessary so as to overlap the first region 30A and the second region 30B with each other. The coil forming board 30 on which the power receiving coil 31 is formed may be also referred to as a coil component.

Figure 4:
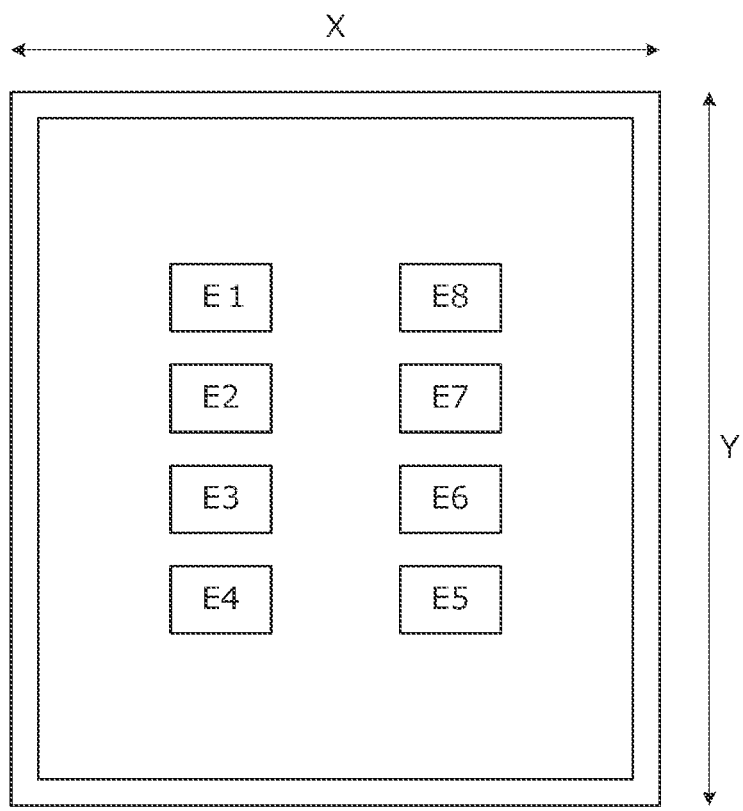
FIG. 4 is a bottom view of the wireless rechargeable solid-state battery module.

FIG. 4 is a bottom view of the wireless rechargeable solid-state battery module 101. In this example, eight terminals E1 to E8 are provided. The plane dimensions of the wireless rechargeable solid-state battery module 101 are X=10 mm and Y=11 mm, and a dimension of each of the terminals E1 to E8 is 1.8 mm×1.2 mm.

A name, a function, and a role of each terminal are shown below.

| | | |
|---|---|---|
| E1: VBAT+ | battery voltage output terminal (2.0 V to 4.35 V) |
| E2: CSO | charging state monitoring terminal |
| E3: VOUT | positive electrode terminal (1.8 V or 3.0 V or 3.3 V) |
| E4: RC1 | power receiving terminal |
| E5: GND | negative electrode terminal |
| E6: ISET | charging current control input terminal |
| E7: RC2 | power receiving terminal |
| E8: VIN | voltage input terminal |

Here, the battery voltage output terminal E1 is a positive electrode output terminal of the solid-state battery 1. The charging state monitoring terminal E2 outputs a signal indicating a charging state of the solid-state battery 1. The positive electrode terminal E3 is an output terminal of an output voltage stabilization circuit. The negative electrode terminal E5 is a terminal of a ground potential. The charging current control input terminal E6 is an input terminal for controlling charging current. The voltage input terminal E8 is a terminal that is used for inputting, for example, 5 V as a power supply voltage from an outside when wireless charging is not performed. The power receiving terminals E4 and E7 are terminals to be connected with the power receiving coil 31. Here, the charging current control input terminal E6 can be configured to be unexposed to the outside.

Figure 5:
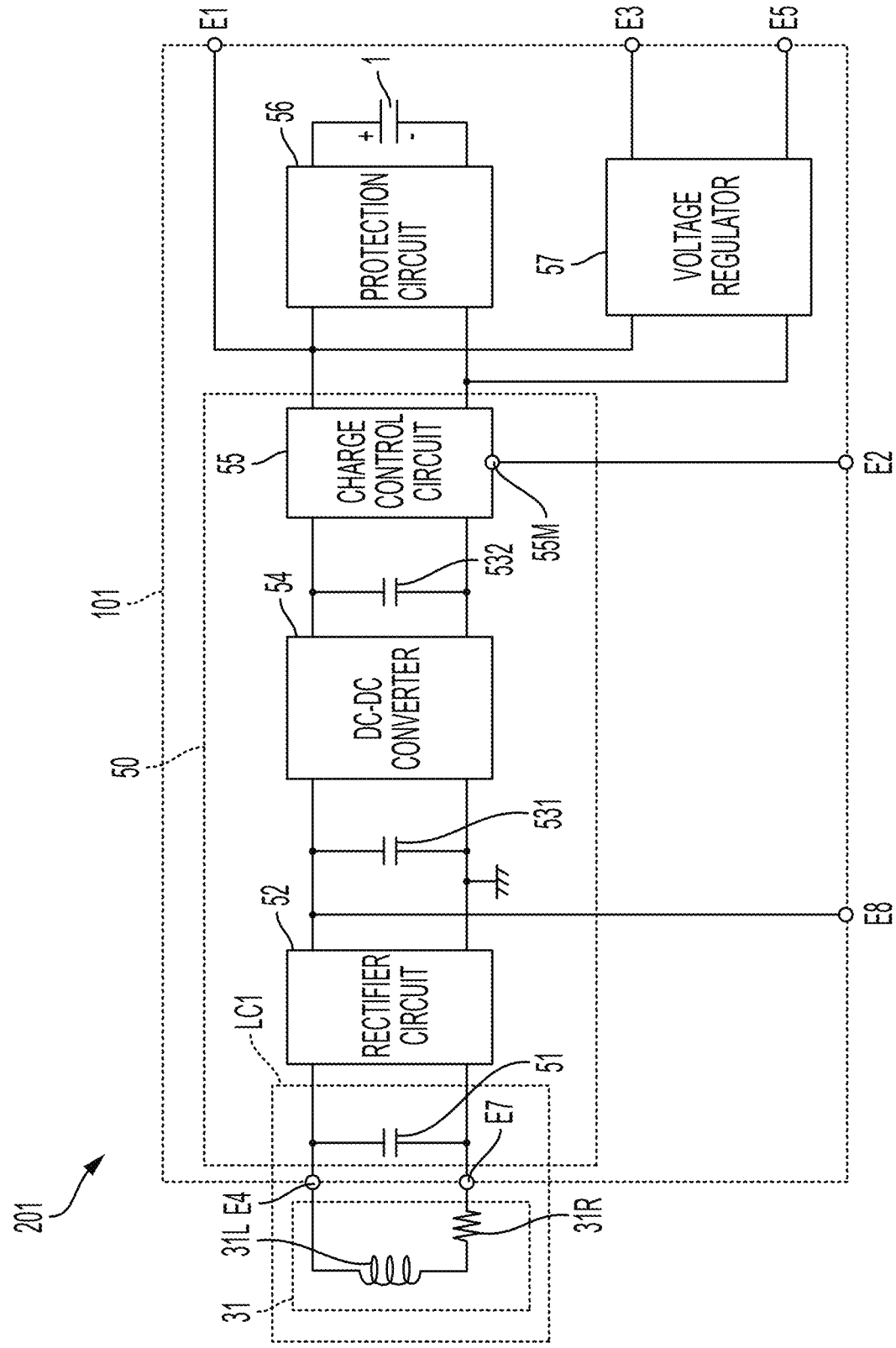
FIG. 5 is a circuit diagram of the wireless rechargeable solid-state battery module.

FIG. 5 is a circuit diagram of the wireless rechargeable solid-state battery module 101 and the wireless power supply module 201. This wireless rechargeable solid-state battery module 101 is composed of an internal circuit and the solid-state battery 1. The internal circuit includes a charging circuit 50, a protection circuit 56, and a voltage regulator 57. The power receiving coil 31 is connected to the wireless rechargeable solid-state battery module 101. The wireless power supply module 201 is composed of the wireless rechargeable solid-state battery module 101 and the power receiving coil 31.

The charging circuit 50 includes the rectifier circuit 52, the DC-DC converter 54, and the charge control circuit 55. The rectifier circuit 52 rectifies induced current of the power receiving coil 31. The DC-DC converter 54 converts an output voltage of the rectifier circuit 52 so as to generate a charging voltage. The charge control circuit 55 inputs an output voltage of the DC-DC converter 54 so as to perform charging control of the solid-state battery 1. Here, the DC-DC converter 54 corresponds to a "voltage conversion circuit" of the present disclosure. The power receiving coil 31 is expressed with an inductor 31L and an equivalent resistance 31R. A resonant capacitor 51 is connected to the power receiving coil 31. The resonant capacitor 51 constitutes a resonant circuit LC1 together with the power receiving coil 31. A capacitor 531 is connected to an output of the rectifier circuit 52. A capacitor 532 is connected to an output of the DC-DC converter 54. Further, the protection circuit 56 is provided between the charge control circuit 55 and the solid-state battery 1. The voltage regulator 57 is further provided between a connection point of the charge control circuit 55 and the protection circuit 56 and the positive electrode terminal E3 and between the connection point and the negative electrode terminal E5. The voltage regulator 57 is, for example, a low dropout regulator (LDO) and is a linear regulator composed of a MOS-FET and an operational amplifier. The voltage regulator 57 stabilizes a voltage of the solid-state battery 1 and outputs the stabilized voltage to the positive electrode terminal E3 and the negative electrode terminal E5. Here, the voltage regulator 57 corresponds to a "discharging circuit" and an "output voltage stabilization circuit" of the present disclosure.

The resonant circuit LC1 resonates in a frequency band of a magnetic field received from the power transmission device, such as frequency bands of 6.78 MHz and 13.56 MHz. These frequency bands are industrial scientific and medical (ISM) bands, and are favorable in a design with electromagnetic compatibility (EMC). The power receiving coil 31 outputs received power to the rectifier circuit 52. The rectifier circuit 52 rectifies the received AC voltage to direct current. The capacitor 531 smooths an output voltage of the rectifier circuit 52 and outputs the voltage to the DC-DC converter 54. The DC-DC converter 54 converts the voltage and outputs the converted voltage to the charge control circuit 55. The capacitor 532 smooths the output voltage of the DC-DC converter 54. The charge control circuit 55 charges the solid-state battery 1 with the received DC voltage that is obtained through the rectification from alternate current and through the voltage conversion. The voltage regulator 57 converts an output voltage of the solid-state battery 1 and outputs the converted voltage to the positive electrode terminal E3 and the negative electrode terminal E5.

The protection circuit 56 performs overcurrent protection in charging/discharging of the solid-state battery 1 and performs protection for overvoltage input to the solid-state battery 1. When charging/discharging current to the solid-state battery 1 exceeds a specified value, the protection circuit 56 limits the current. Also, when a voltage of the solid-state battery 1 exceeds a predetermined value, the protection circuit 56 limits the charging current. Further, when the temperature or an ambient temperature of the solid-state battery 1 is out of a range of a predetermined value, the protection circuit 56 suppresses the charging or discharging.

In the example illustrated in FIG. 5, the voltage input terminal E8 for inputting a voltage is connected to an input unit of the DC-DC converter 54. In a state in which power reception is not performed with the power receiving coil 31, the wireless rechargeable solid-state battery module 101 is operated by inputting a certain value or larger voltage (for example, 5 V) from the voltage input terminal E8. The voltage input terminal E8 may be connected to the input unit of the rectifier circuit 52.

The battery voltage output terminal E1 is connected to the positive electrode 1P of the solid-state battery 1 via the protection circuit 56. The voltage of the solid-state battery 1 can be detected via the battery voltage output terminal E1.

The charge control circuit 55 includes a monitor signal output unit 55M that outputs a signal which indicates a charging control state with respect to the solid-state battery 1. The charging state monitoring terminal E2 is connected to the monitor signal output unit 55M. The charging control state of the solid-state battery 1 can be detected via the charging state monitoring terminal E2.

Figure 6:
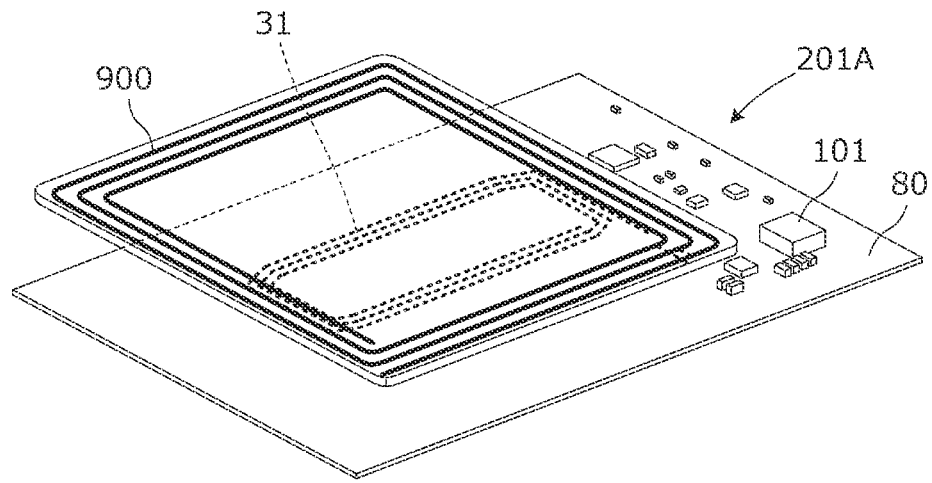
FIG. 6 is a perspective view illustrating an example of a positional relation between a wireless power supply module and a power transmission coil of a power transmission device[

FIG. 6 is a perspective view illustrating an example of a positional relation between the wireless power supply module 201A and a power transmission coil 900 of a power transmission device according to the present embodiment. The wireless power supply module 201A has the configuration as that illustrated in FIG. 3A. The wireless power supply module 201A is housed in a casing of an electronic device, in practice. In a similar manner, the power transmission coil 900 is housed in a casing of the power transmission device. The coil opening of the power receiving coil 31, formed on the electronic circuit board 80, and a coil opening of the power transmission coil 900 are overlapped with each other in plan view. The power receiving coil 31 and the power transmission coil 900 are mutually coupled via a magnetic field in a state in which the power receiving coil 31 and the power transmission coil 900 are brought mutually closer within a prescribed distance, and power transmission/reception is performed via the magnetic field.

Figure 7:
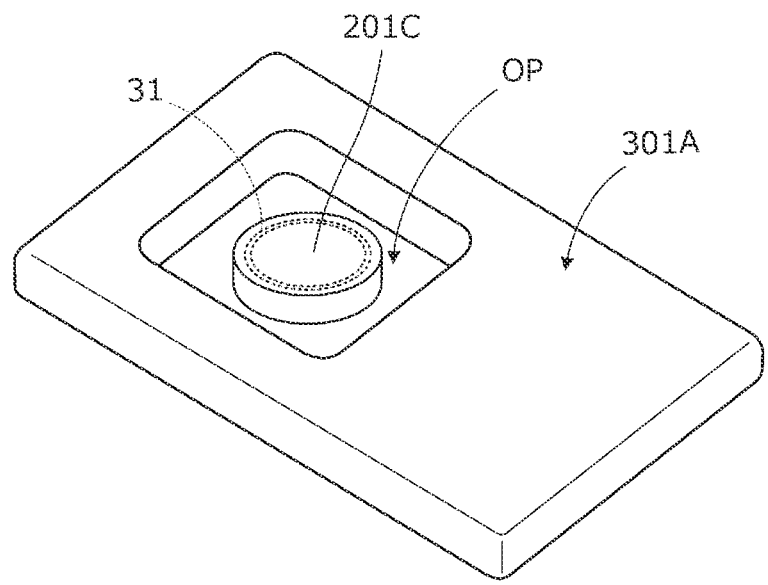
FIG. 7 is a perspective view illustrating an example of a positional relation between a wireless power supply module and a power transmission device.

FIG. 7 is a perspective view illustrating an example of a positional relation between the wireless power supply module 201C and a power transmission device 301A. The wireless power supply module 201C has the internal configuration as that illustrated in FIG. 3C. For example, the first region 30A and the second region 30B are overlapped with each other by bending the third region 30C illustrated in FIG. 3C and the whole body is sealed with resin. In this example, the power transmission device 301A has an opening OP and a power transmission coil is formed in a manner to be wound around the opening OP. When the opening OP of the power transmission device 301A is put over the wireless power supply module 201C, the coil opening of the power receiving coil 31 of the wireless power supply module 201C and the coil opening of the power transmission coil are mutually overlapped in plan view. Power transmission/reception is performed via the magnetic field.

Figure 8:
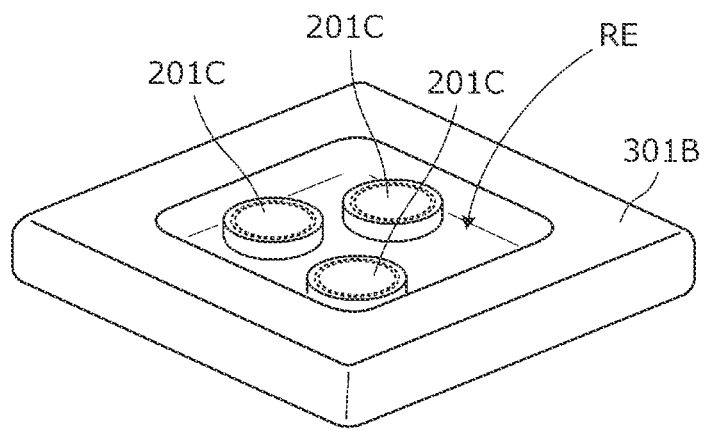
FIG. 8 is a perspective view illustrating a state in which a power transmission device transmits power to a plurality of the wireless power supply modules.

FIG. 8 is a perspective view illustrating a state in which a power transmission device 301B transmits power to a plurality of the wireless power supply modules 201C. In this example, the power transmission device 301B has a concave portion RE and a power transmission coil is formed in a manner to be wound around the concave portion RE. Further, a power receiving coil is provided in each of the plurality of the wireless power supply modules 201C. When the wireless power supply modules 201C are put in the concave portion RE of the power transmission device 301B, the coil opening of the power receiving coil 31 in each of the wireless power supply modules 201C and the coil opening of the power transmission coil are mutually overlapped in plan view. Power transmission/reception is performed via the magnetic field.

Features of the wireless rechargeable solid-state battery module 101 and the wireless power supply modules 201A, 201B, and 201C described above will be listed as follows.

(1) The arrangement of the power receiving coil 31 on the outside of the wireless rechargeable solid-state battery module 101 achieves the wireless rechargeable solid-state battery module 101 that exhibits high waterproofness and provides high flexibility in configuration design of the power receiving coil, and whose power loss is lowered. The wireless rechargeable solid-state battery module 101 can be utilized as a wireless power supply with enhanced wireless charging efficiency.

(2) Even with the airtight sealing structure by the first barrier layer 4 having conductivity, the wireless charging performance is not degraded.

(3) The wireless rechargeable solid-state battery module 101 is integrally provided, achieving reduction in seize and thickness and being used as a highly-convenient component.

(4) A portion constituting the internal circuit connected to the solid-state battery 1 is overlapped with the solid-state battery 1 in plan view, being able to provide a wireless rechargeable solid-state battery module that has substantially the same area as that of the solid-state battery 1 but is provided with peripheral circuits.

(5) The incorporation of an internal circuit corresponding to characteristics of the solid-state battery 1 eliminates a necessity of designing based on characteristics of individual solid-state batteries on the user side, improving convenience.

(6) The positive electrode terminal E3 and the negative electrode terminal E5 are arranged on a lower surface, having a large area, of a package having a rectangular parallelepiped shape, enabling surface mounting on a mounting board by a reflow soldering method.

Second Embodiment

A second embodiment will exemplify a wireless rechargeable solid-state battery module and a wireless power supply module in which a power receiving coil and a resonant capacitor are provided in the outside.

Figure 9:
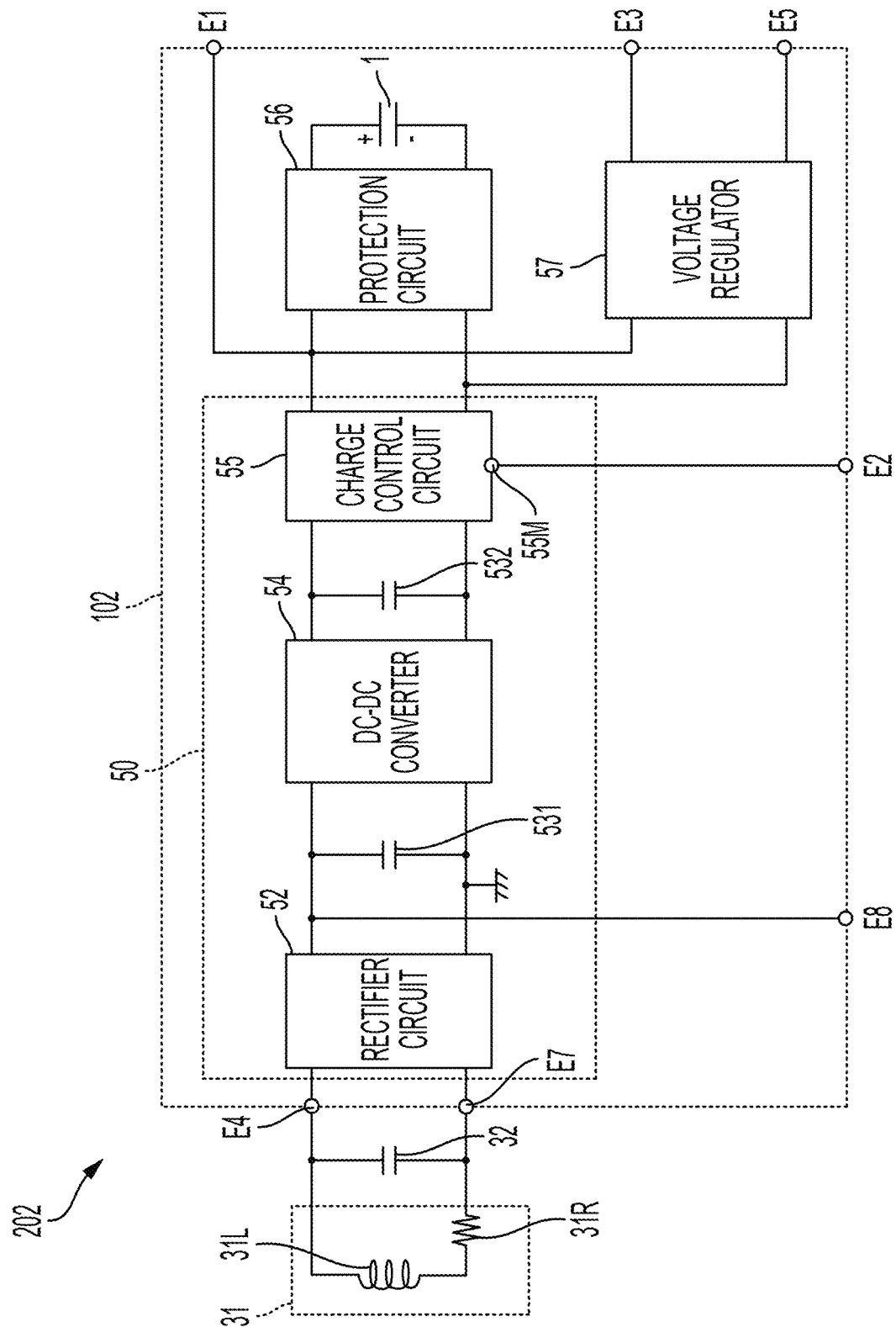
FIG. 9 is a circuit diagram of a wireless rechargeable solid-state battery module and a wireless power supply module according to a second embodiment.

FIG. 9 is a circuit diagram of a wireless rechargeable solid-state battery module 102 and a wireless power supply module 202 according to the second embodiment. This wireless rechargeable solid-state battery module 102 is composed of an internal circuit and the solid-state battery 1. The internal circuit includes the charging circuit 50, the protection circuit 56, and the voltage regulator 57. The power receiving coil 31 and a resonant capacitor 32 are connected to the wireless rechargeable solid-state battery module 102. The wireless power supply module 202 is composed of the wireless rechargeable solid-state battery module 102, the power receiving coil 31, and the resonant capacitor 32.

Different from the wireless rechargeable solid-state battery module 101 illustrated in FIG. 5 in the first embodiment, not only the power receiving coil 31 but also the resonant capacitor 32 are connected in the outside of the wireless rechargeable solid-state battery module 102. Other configurations are the same as those of the first embodiment.

According to the second embodiment, the resonant capacitor constituting a resonant circuit together with the power receiving coil 31 is provided and therefore, a resonance condition can be set in the outside of the wireless rechargeable solid-state battery module 102. Accordingly, the resonant circuit on the wireless power supply module 202 side can be set depending on the resonant circuit on the power transmission device side so that the resonant circuit on the power transmission device side and the resonant circuit on the wireless power supply module side are mutually coupled to produce predetermined magnetic field resonance.

Third Embodiment

A third embodiment will exemplify a wireless rechargeable solid-state battery module and a wireless power supply module in which a power receiving coil, a resonant capacitor, and a rectifying and smoothing circuit are provided in the outside.

Figure 10:
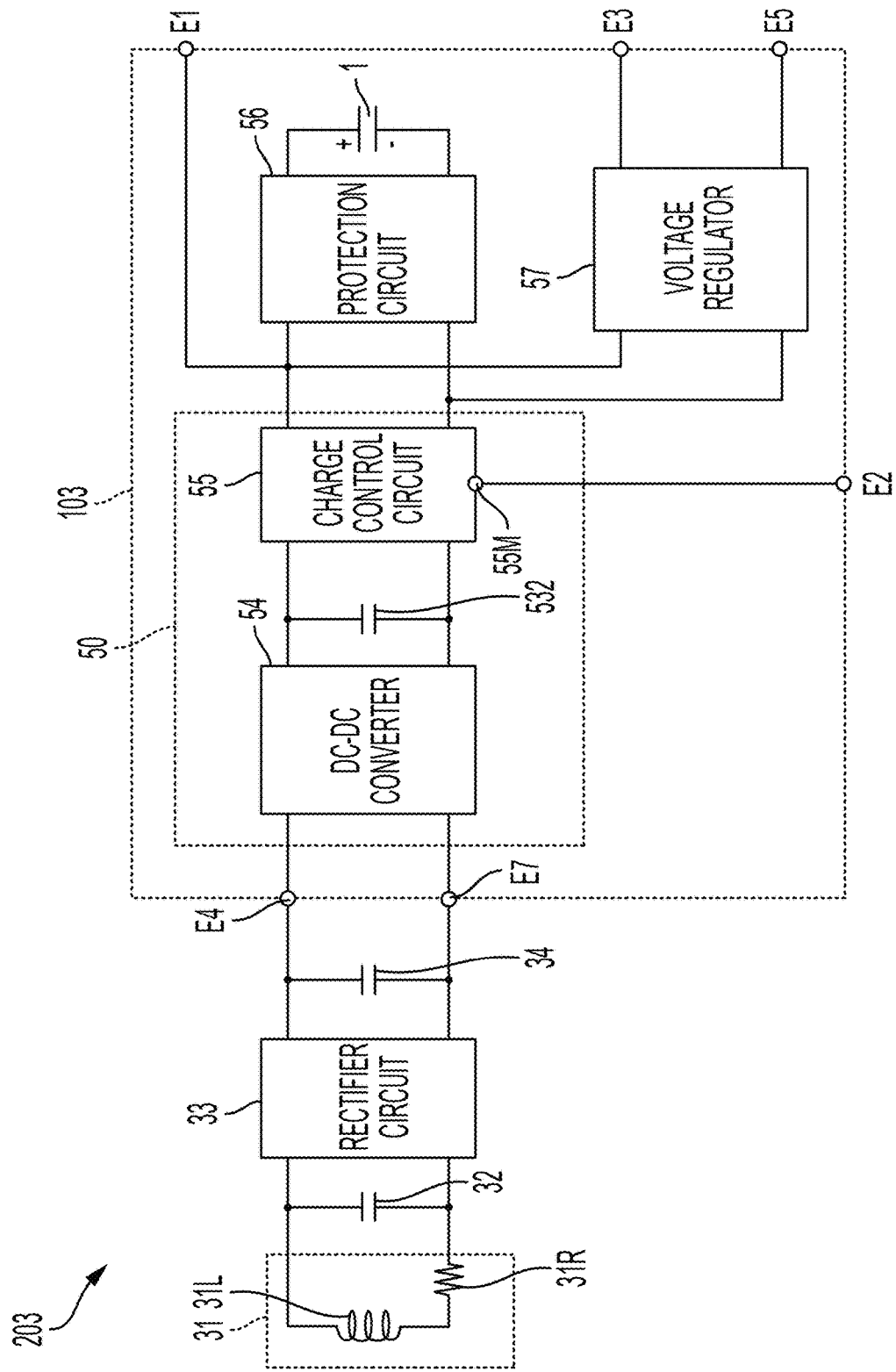
FIG. 10 is a circuit diagram of a wireless rechargeable solid-state battery module and a wireless power supply module according to a third embodiment.

FIG. 10 is a circuit diagram of a wireless rechargeable solid-state battery module 103 and a wireless power supply module 203 according to the third embodiment. This wireless rechargeable solid-state battery module 103 is composed of an internal circuit and the solid-state battery 1. The internal circuit includes the charging circuit 50, the protection circuit 56, and the voltage regulator 57. The power receiving coil 31, the resonant capacitor 32, a rectifier circuit 33, and a capacitor 34 are connected to the wireless rechargeable solid-state battery module 103. The wireless power supply module 203 is composed of the wireless rechargeable solid-state battery module 103, the power receiving coil 31, the resonant capacitor 32, the rectifier circuit 33, and the capacitor 34.

The DC-DC converter 54 is connected with the power receiving terminals E4 and E7 in the wireless rechargeable solid-state battery module 103.

Different from the wireless rechargeable solid-state battery module 101 illustrated in FIG. 5 in the first embodiment, not only the power receiving coil 31 but also the resonant capacitor 32, the rectifier circuit 33, and the capacitor 34 are connected to the outside of the wireless rechargeable solid-state battery module 103. Other configurations are the same as those of the first embodiment.

The rectifier circuit 33 rectifies an AC voltage that is generated by a resonant circuit composed of the power receiving coil 31 and the resonant capacitor 32. The capacitor 34 smooths an output voltage of the rectifier circuit 33. The capacitor 34 for smoothing may be provided in the inside of the wireless rechargeable solid-state battery module as the capacitor 531 illustrated in FIG. 5.

According to the third embodiment, the rectifier circuit 33 is provided in the outside of the wireless rechargeable solid-state battery module 103 and therefore, current flowing into the power receiving terminals E4 and E7 is direct current. This configuration can largely reduce an influence of high frequency loss or the like caused by inductance of wiring provided in the inner side from the power receiving terminals E4 and E7. Further, the capacitor 34 for smoothing is also provided in the outside of the wireless rechargeable solid-state battery module 103 and therefore, a capacitor with large capacitance can be provided without increasing the wireless rechargeable solid-state battery module 103 in size.

Fourth Embodiment

A fourth embodiment will describe a wireless rechargeable solid-state battery module having a different circuit configuration from that in the example described in the first embodiment.

Figure 11:
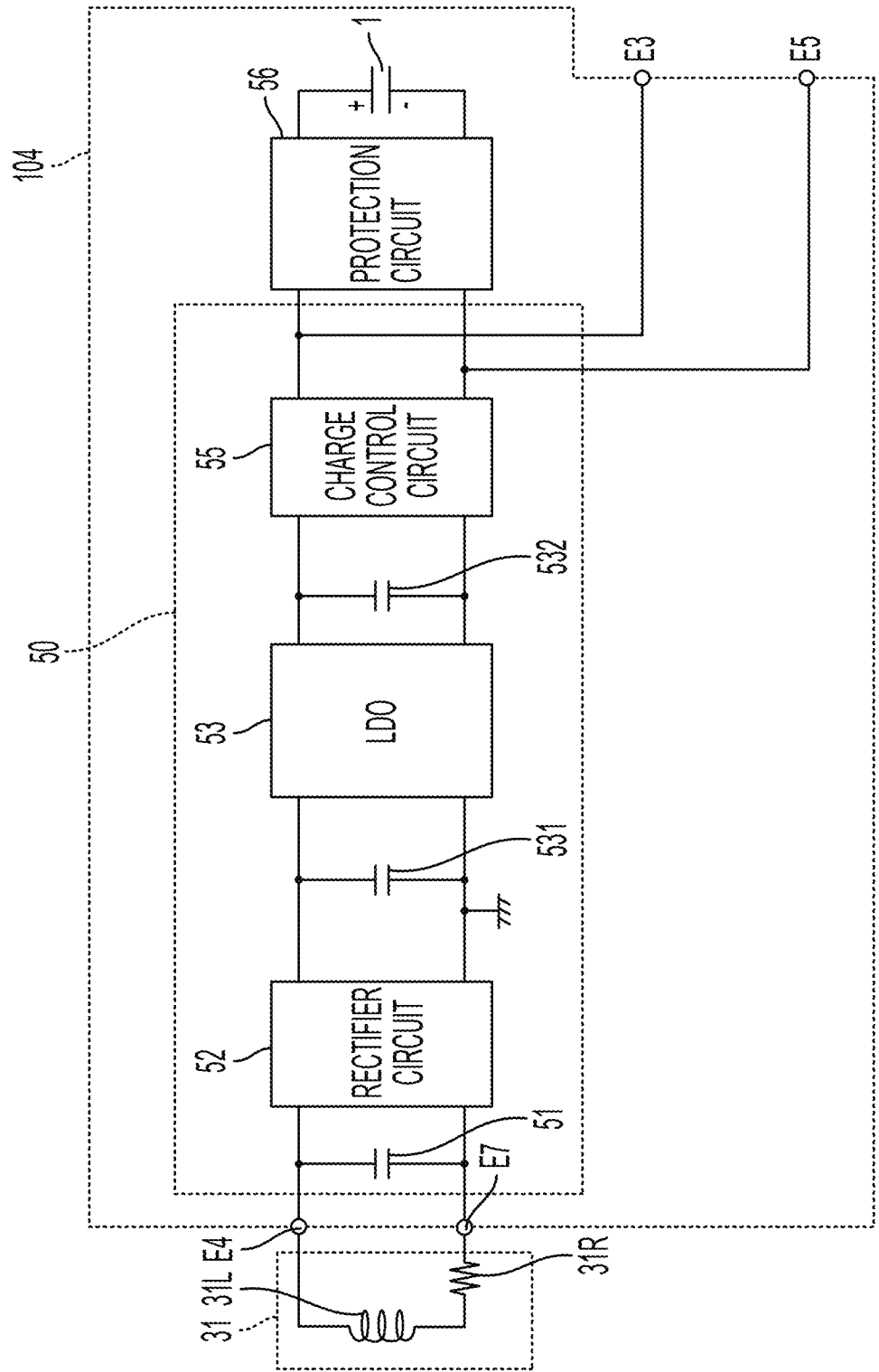
FIG. 11 is a circuit diagram of a wireless rechargeable solid-state battery module according to a fourth embodiment.

FIG. 11 is a circuit diagram of a wireless rechargeable solid-state battery module 104 according to the fourth embodiment. This wireless rechargeable solid-state battery module 104 is composed of an internal circuit and the solid-state battery 1. The internal circuit includes the charging circuit 50 and the protection circuit 56. The power receiving coil 31 is connected to the wireless rechargeable solid-state battery module 104.

A voltage regulator 53 is, for example, a low dropout regulator (LDO) and is a linear regulator composed of a MOS-FET and an operational amplifier. The voltage regulator 53 stabilizes an output voltage of the rectifier circuit 52. The circuit configuration other than the voltage regulator 53 is the same as that in the example illustrated in FIG. 5. However, the example illustrated in FIG. 11 does not include the voltage regulator 57.

Thus, a rectified voltage may be stabilized with a linear regulator. This configuration achieves voltage regulation in a lower range of voltage induced by the power receiving coil 31.

Fifth Embodiment

A fifth embodiment will describe a wireless rechargeable solid-state battery module having a different circuit configuration from that in the example described in the first embodiment. A circuit configuration of a power transmission device will be also described.

Figure 12:
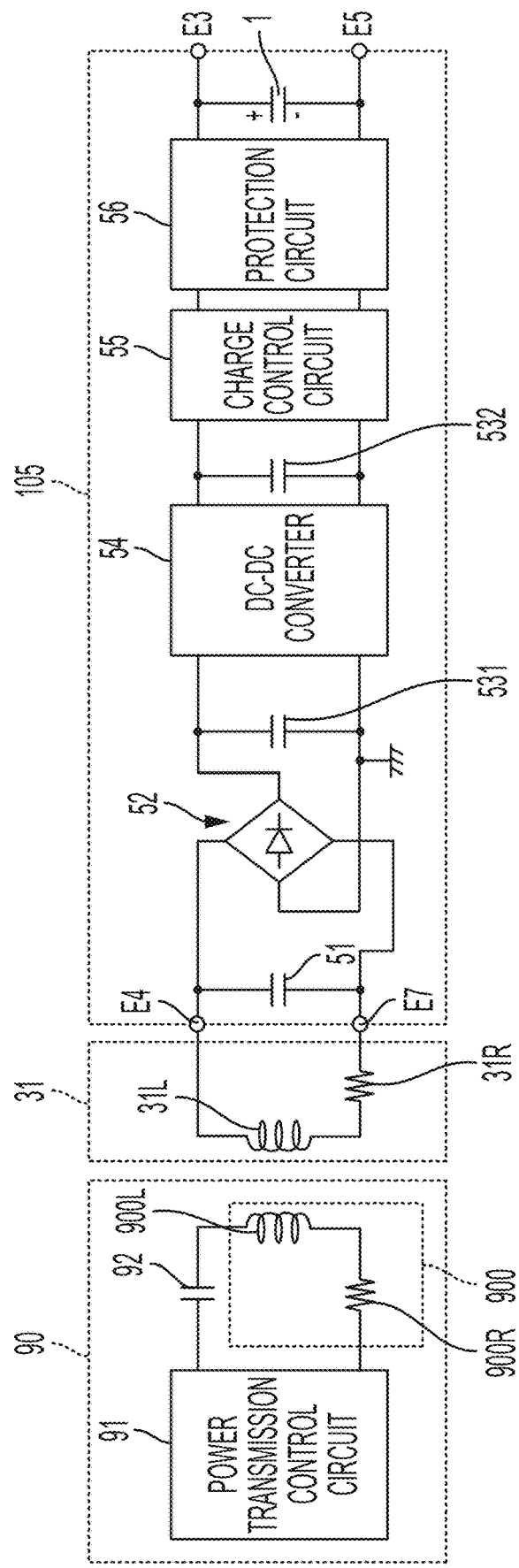
FIG. 12 is a circuit diagram of a wireless rechargeable solid-state battery module according to a fifth embodiment.

FIG. 12 is a circuit diagram of a wireless rechargeable solid-state battery module 105 according to the fifth embodiment. This wireless rechargeable solid-state battery module 105 includes the rectifier circuit 52, the DC-DC converter 54, the charge control circuit 55, the solid-state battery 1, and the protection circuit 56.

In the wireless rechargeable solid-state battery module 105, the voltage regulator 57 illustrated in FIG. 5 is not provided and the positive electrode terminal E3 and the negative electrode terminal E5 are connected to the output unit of the solid-state battery 1. Other configurations are the same as those of the example illustrated in FIG. 5. However, FIG. 12 shows the rectifier circuit 52 with a diode bridge circuit.

A power transmission device 90 includes a power transmission control circuit 91, the power transmission coil 900, and a resonant capacitor 92. The power transmission coil 900 is expressed with an inductor 900L and an equivalent resistance 900R. The power transmission coil 900 and the resonant capacitor 92 constitute a resonant circuit that resonates in a power transmission frequency band. The resonant circuit resonates in frequency bands of 6.78 MHz and 13.56 MHz, for example. These frequency bands are industrial scientific and medical (ISM) bands, and are favorable in a design with electromagnetic compatibility (EMC). The resonance circuit on the power transmission device side and the resonant circuit composed of the power receiving coil 31 and the resonant capacitor 51 on the wireless rechargeable solid-state battery module 105 side are mutually coupled to produce magnetic field resonance.

The power transmission control circuit 91 of the power transmission device 90 interrupts direct current traveling to the power transmission coil 900 so as to generate an alternating magnetic field from the power transmission coil 900. Thus, power is transmitted from the power transmission device 90 to the wireless rechargeable solid-state battery module 105 with the use of a DC resonant technique.

The wireless rechargeable solid-state battery module 105 outputs 3.7 V, for example, as a discharging voltage of the solid-state battery 1.

According to the present embodiment, power is transmitted from the power transmission device to the wireless rechargeable solid-state battery module by using the DC resonant technique and therefore, highly efficient charging can be achieved. This configuration enhances flexibility in the positional relation between the power transmission device and the wireless rechargeable solid-state battery module.

Sixth Embodiment

A sixth embodiment will describe a wireless rechargeable solid-state battery module that transmits a communication signal to a power transmission device.

Figure 13:
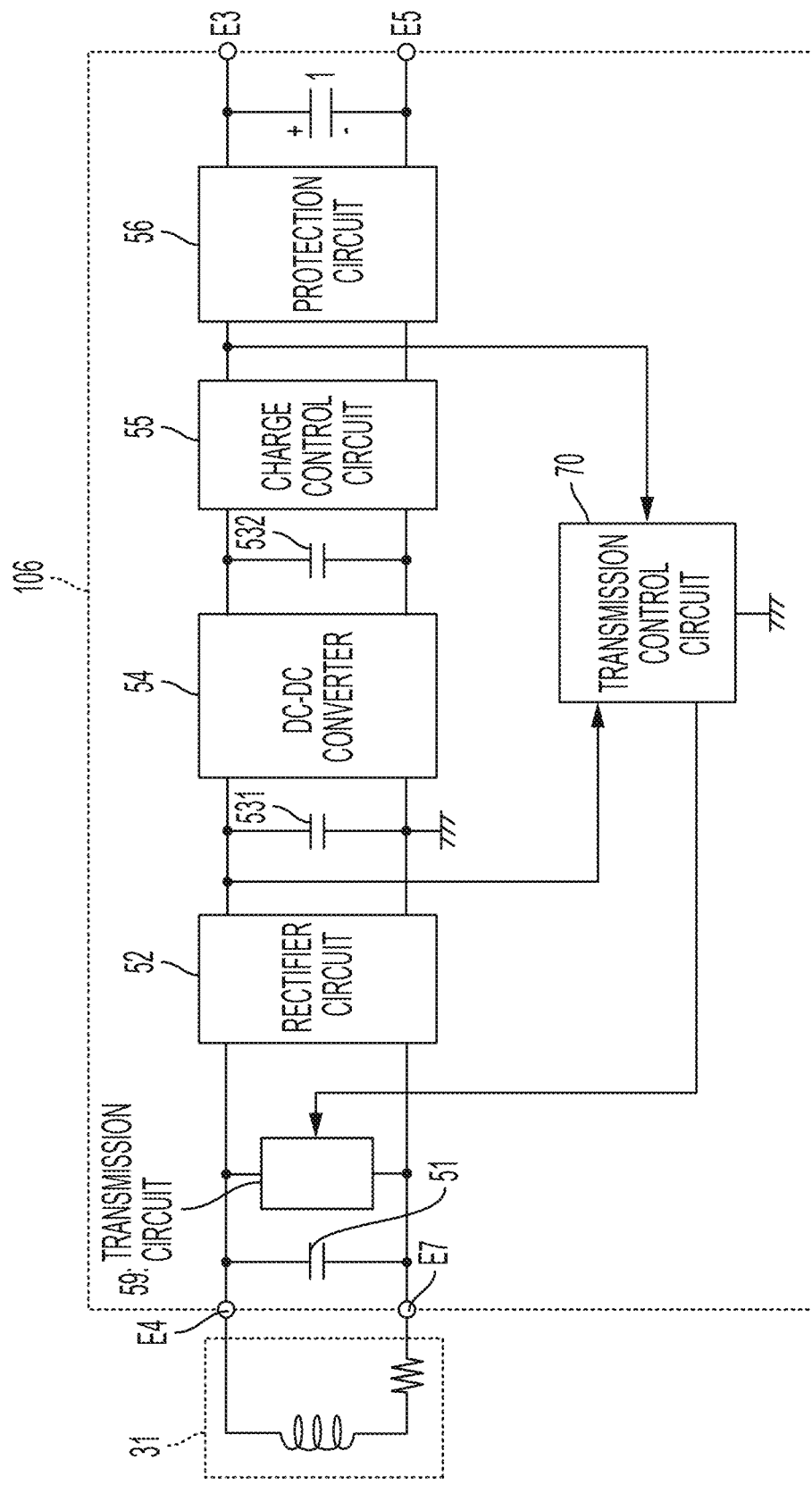
FIG. 13 is a circuit diagram of a wireless rechargeable solid-state battery module according to a sixth embodiment.

FIG. 13 is a circuit diagram of a wireless rechargeable solid-state battery module 106 according to the sixth embodiment. This wireless rechargeable solid-state battery module 106 includes the rectifier circuit 52, the DC-DC converter 54, the charge control circuit 55, the solid-state battery 1, the protection circuit 56, a transmission control circuit 70, and a transmission circuit 59.

The transmission circuit 59 transmits a communication signal in response to change of power consumption of a circuit connected with the power receiving coil 31. That is, binary amplitude-shift keying (ASK) is performed in a manner such that a load on the power receiving side is changed by backscatter modulation similar to a passive RFID tag. Alternatively, the transmission circuit 59 changes a resonance condition of the resonant circuit composed of the power receiving coil 31 and the resonant capacitor 51 so as to transmit a signal through this change. For example, the resonant capacitor 51 and the transmission circuit 59 change an equivalent resonant capacitance so as to change a resonant frequency of the resonant circuit. This changes an impedance of the resonant circuit based on the power transmission device with respect to the power receiving side and the power transmission device accordingly receives a communication signal.

The transmission control circuit 70 inputs an output voltage of the rectifier circuit 52, a voltage of the solid-state battery 1, and the like and produces transmission data based on these values. The transmission data include difference of a received power amount with respect to a required amount, a power transmission stop request, power being received, and a charging rate to the solid-state battery 1, for example.

Seventh Embodiment

A seventh embodiment will describe a wireless rechargeable solid-state battery module including a power reception protection circuit that stops power reception when a received voltage exceeds a prescribed voltage range.

Figure 14:
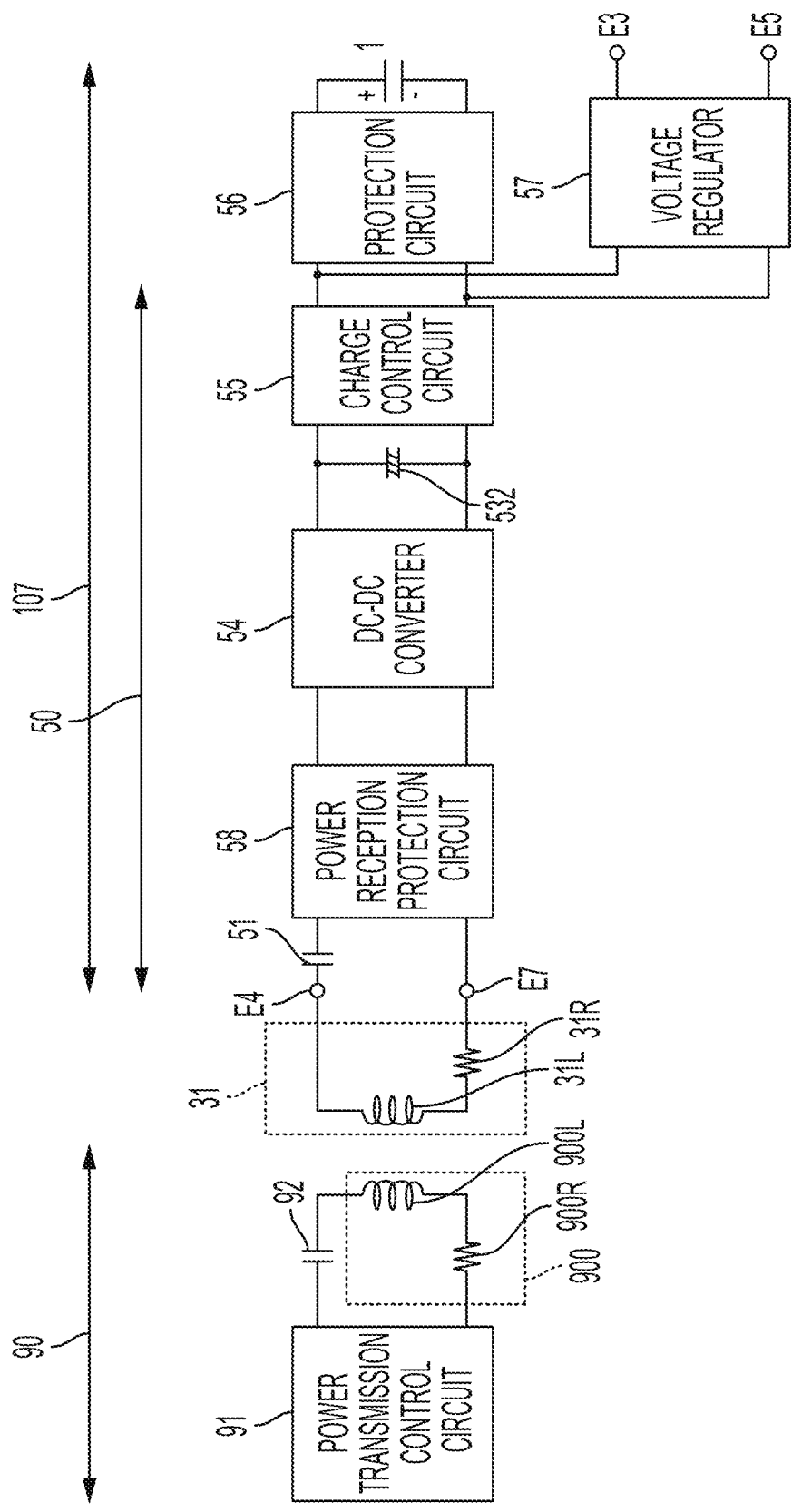
FIG. 14 is a circuit diagram of a wireless rechargeable solid-state battery module and the like according to a seventh embodiment.

FIG. 14 is a circuit diagram of a wireless rechargeable solid-state battery module 107 and the like according to the seventh embodiment. FIG. 14 also illustrates a circuit of the power transmission device 90.

The wireless rechargeable solid-state battery module 107 includes the solid-state battery 1, the charging circuit 50, the protection circuit 56, and the voltage regulator 57. The protection circuit 56 protects the solid-state battery 1. The voltage regulator 57 converts current of the solid-state battery 1 into an output voltage for a general-purpose battery. The charging circuit 50 includes a power reception protection circuit 58, the DC-DC converter 54, and the charge control circuit 55. The DC-DC converter 54 converts an output voltage of a rectifying and smoothing circuit included in the power reception protection circuit 58 so as to generate a charging voltage. The charge control circuit 55 inputs an output voltage of the DC-DC converter 54 so as to perform charging control of the solid-state battery 1. The power reception protection circuit 58 rectifies induced current of the power receiving coil 31, and stops power reception of the DC-DC converter 54 when a received voltage exceeds a prescribed voltage range.

The power receiving coil 31 is expressed with the inductor 31L and the equivalent resistance 31R. The resonant capacitor 51 is connected to the power receiving coil 31. The resonant capacitor 51 constitutes a resonant circuit together with the power receiving coil 31. The capacitor 532 is connected to the output of the DC-DC converter 54. The voltage regulator 57 is, for example, a low dropout regulator (LDO) and is a linear regulator composed of a MOS-FET and an operational amplifier. The voltage regulator 57 stabilizes a voltage of the solid-state battery 1 and outputs the stabilized voltage to the positive electrode terminal E3 and the negative electrode terminal E5.

The power transmission device 90 includes the power transmission control circuit 91, the power transmission coil 900, and the resonant capacitor 92. The power transmission coil 900 is expressed with the inductor 900L and the equivalent resistance 900R. The power transmission coil 900 and the resonant capacitor 92 constitute a resonant circuit that resonates in a power transmission frequency band. The resonant circuit resonates in frequency bands of 6.78 MHz and 13.56 MHz, for example. These frequency bands are industrial scientific and medical (ISM) bands, and are favorable in a design with electromagnetic compatibility (EMC). The resonance circuit on the power transmission device side and the resonant circuit composed of the power receiving coil 31 and the resonant capacitor 51 on the wireless rechargeable solid-state battery module 107 side are mutually coupled to produce magnetic field resonance.

The resonant circuit composed of the power receiving coil 31 and the resonant capacitor 51 resonates in a frequency band of an electromagnetic field or a magnetic field received from the power transmission device 90, such as frequency bands of 6.78 MHz and 13.56 MHz. The power receiving coil 31 outputs received power to the power reception protection circuit 58. The power reception protection circuit 58 rectifies a received AC voltage into direct current, and stops power reception of the DC-DC converter 54 when a received voltage exceeds a prescribed voltage range. The DC-DC converter 54 converts a voltage and outputs the converted voltage to the charge control circuit 55. The capacitor 532 smooths the output voltage of the DC-DC converter 54. The charge control circuit 55 charges the solid-state battery 1 with the received DC voltage that is obtained through the rectification from alternate current and through the voltage conversion. The voltage regulator 57 converts an output voltage of the solid-state battery 1 and outputs the converted voltage to the positive electrode terminal E3 and the negative electrode terminal E5.

The protection circuit 56 performs overcurrent protection in charging/discharging of the solid-state battery 1 and performs protection for overvoltage input to the solid-state battery 1. Further, the protection circuit 56 performs overheat protection depending on a resistance value of a NTC thermistor. For example, when charging/discharging current to the solid-state battery 1 exceeds a specified value, the protection circuit 56 limits the current. Also, when a voltage of the solid-state battery 1 exceeds a predetermined value, the protection circuit 56 limits the charging current. Further, when the temperature or an ambient temperature of the solid-state battery 1 is out of a range of a predetermined value, the protection circuit 56 suppresses the charging or discharging.

FIGS. 15A, 15B, 15C, and 15D are circuit diagrams illustrating specific examples of the power reception protection circuit 58 illustrated in FIG. 14.

Figure 15A:
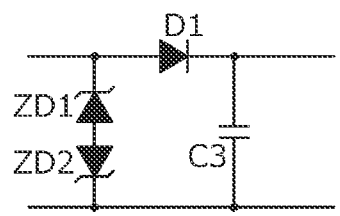
FIGS. 15A, 15B, 15C, and 15D are circuit diagrams illustrating specific examples of a power reception protection circuit.

In the example illustrated in FIG. 15A, a rectifying and smoothing circuit is composed of a diode D1 and a capacitor C3. When a received voltage exceeds Zener voltages of Zener diodes ZD1 and ZD2, both ends of a connection circuit of the Zener diodes ZD1 and ZD2 are brought into conduction and the received voltage is limited to the Zener voltage.

Figure 15B:
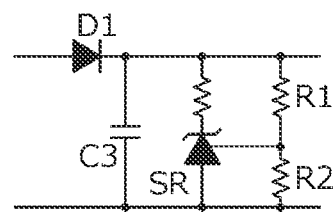

In the example illustrated in FIG. 15B, a rectifying and smoothing circuit is composed of a diode D1 and a capacitor C3. When a divided voltage of resistances R1 and R2 exceeds a reference voltage of a shunt regulator SR, the shunt regulator SR is brought into conduction and a received voltage is limited by a series circuit composed of the shunt regulator SR and the resistances.

Figure 15C:
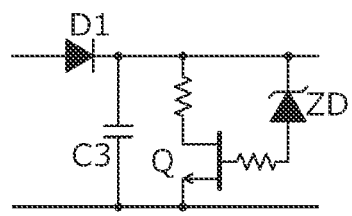

In the example illustrated in FIG. 15C, a rectifying and smoothing circuit is composed of a diode D1 and a capacitor C3. When a rectified and smoothed voltage exceeds a Zener voltage of a Zener diode ZD, a FET Q is brought into conduction and a received voltage is limited by a series circuit composed of the FET Q and resistances.

Figure 15D:
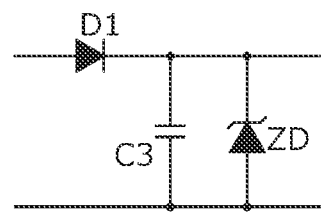

In the example illustrated in FIG. 15D, a rectifying and smoothing circuit is composed of a diode D1 and a capacitor C3. When a rectified and smoothed voltage exceeds a Zener voltage of a Zener diode ZD, the Zener diode ZD is brought into conduction and a received voltage is limited to the Zener voltage.

Thus, when a received voltage exceeds a prescribed voltage range, the power reception protection circuit 58 protects the DC-DC converter 54.

Figure 16:
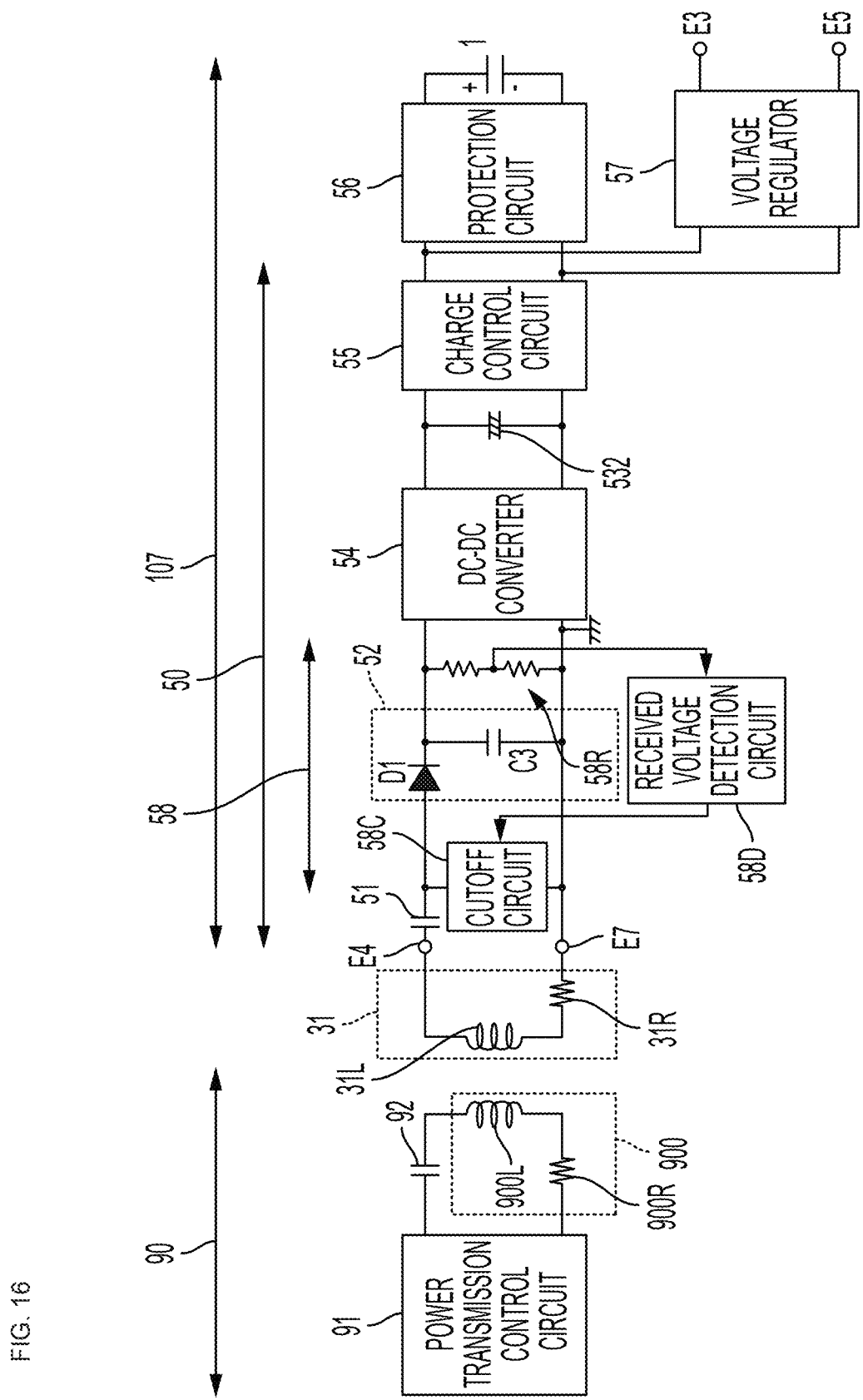
FIG. 16 is another circuit diagram of the wireless rechargeable solid-state battery module and the like according to the seventh embodiment.

FIG. 16 is another circuit diagram of the wireless rechargeable solid-state battery module 107 and the like according to the seventh embodiment. The wireless rechargeable solid-state battery module 107 includes the solid-state battery 1, the charging circuit 50, the protection circuit 56, and the voltage regulator 57. The protection circuit 56 protects the solid-state battery 1. The voltage regulator 57 converts current of the solid-state battery 1 into an output voltage for a general-purpose battery. The charging circuit 50 includes the power reception protection circuit 58, the DC-DC converter 54, and the charge control circuit 55. The DC-DC converter 54 converts an output voltage of a rectifying and smoothing circuit included in the power reception protection circuit 58 so as to generate a charging voltage. The charge control circuit 55 inputs an output voltage of the DC-DC converter 54 so as to perform charging control of the solid-state battery 1. The power reception protection circuit 58 is composed of a cutoff circuit 58C, a received voltage detection circuit 58D, and a resistance voltage dividing circuit 58R.

When the received voltage detection circuit 58D detects that an output voltage of the resistance voltage dividing circuit 58R exceeds a prescribed value, the received voltage detection circuit 58D outputs a detection signal to the cutoff circuit 58C. When the cutoff circuit 58C receives the detection signal from the received voltage detection circuit 58D, the cutoff circuit 58C stops power reception of the rectifier circuit 52.

Figure 17A:
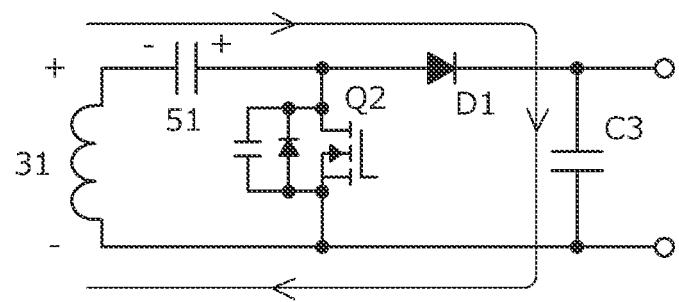
FIGS. 17A and 17B are diagrams for explaining an operation of a cutoff circuit in normal power-reception time.
Figure 17B:
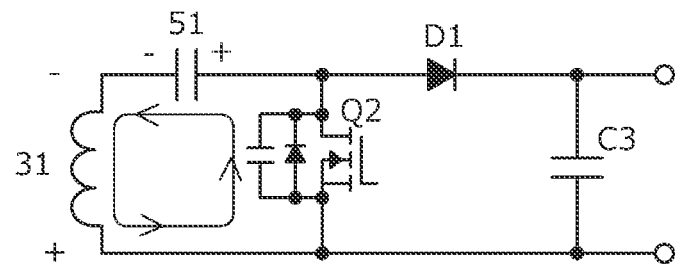

FIGS. 17A and 17B are diagrams for explaining an operation of the cutoff circuit 58C in normal power-reception time. In the normal power-reception time, a FET Q2 of the cutoff circuit 58C is in an off state.

When the first end of the power receiving coil 31 on the capacitor 51 side becomes positive as illustrated in FIG. 17A, current flows in a path along the capacitor 51, the diode D1, and the capacitor C3 from the power receiving coil 31. In this case, a voltage obtained by adding a voltage, charged to the capacitor 51, to a voltage induced by the power receiving coil 31 is charged to the capacitor C3. This voltage is supplied to the rectifier circuit 52.

When the second end of the power receiving coil 31 is positive as illustrated in FIG. 17B, current flows from the power receiving coil 31 through a body diode of the FET Q2 to the capacitor 51. Thus, the capacitor 51 is charged.

In the normal power-reception time, the state illustrated in FIG. 17A and the state illustrated in FIG. 17B are alternately repeated, outputting a received voltage to the rectifier circuit 52.

Figure 18A:
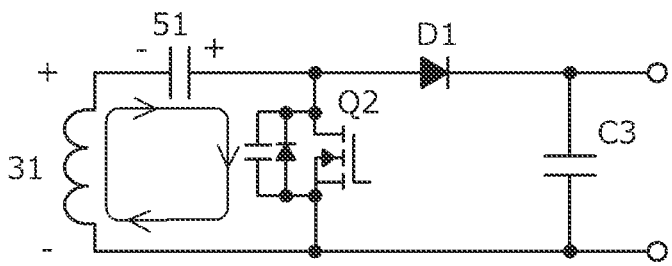
FIGS. 18A and 18B are diagrams for explaining an operation of the cutoff circuit in a state in which a received voltage exceeds a specified value.
Figure 18B:
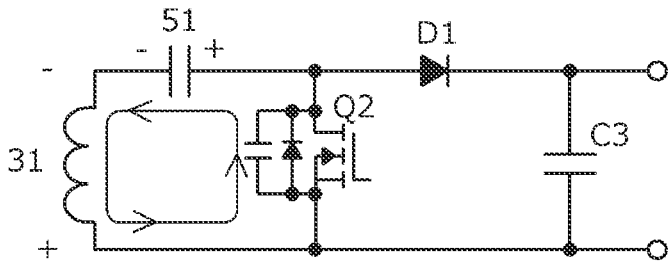

FIGS. 18A and 18B are diagrams for explaining an operation of the cutoff circuit 58C in a state in which a received voltage exceeds a specified value. The FET Q2 shifts to an on state in response to the detection signal outputted from the received voltage detection circuit 58D illustrated in FIG. 16.

When a voltage is induced by the power receiving coil 31 and the first end of the power receiving coil 31 becomes positive as illustrated in FIG. 18A, current flows in a path along the capacitor 51 and the FET Q2 from the power receiving coil 31. When the second end of the power receiving coil 31 is positive as illustrated in FIG. 18B, current flows from the power receiving coil 31 through the body diode of the FET Q2 to the capacitor 51. In the state in which the received voltage exceeds the specified value, the state illustrated in FIG. 18A and the state illustrated in FIG. 18B are alternately repeated. That is, a received voltage is not outputted to the rectifier circuit 52.

Accordingly, even if the power receiving coil 31 receives a magnetic field that is larger than a specified value, power can be cut off by cutting off power reception of the rectifier circuit 52, being able to suppress an influence of heat generation and the like caused by high power reception in the rectifier circuit 52 and circuits on the following stages.

Figure 19A:
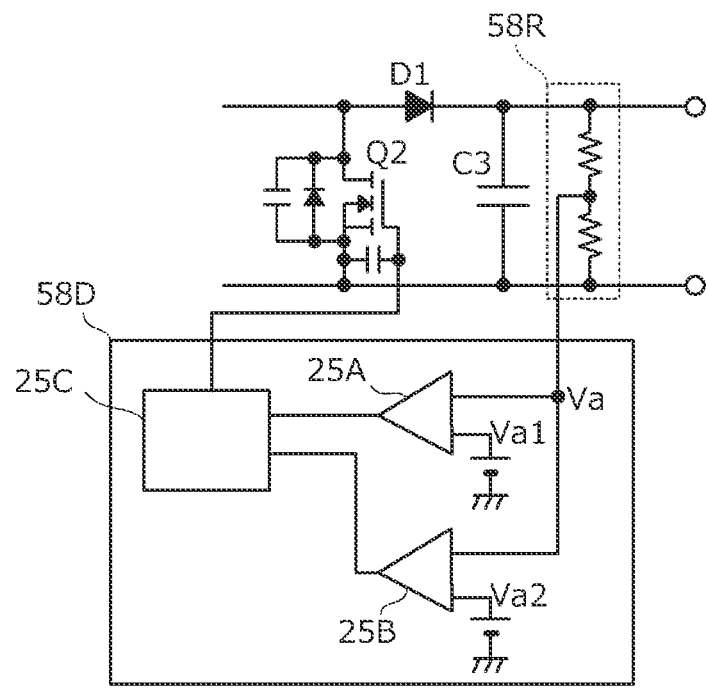
FIGS. 19A and 19B are diagrams illustrating configuration examples of a received voltage detection circuit illustrated in FIG. 16.
Figure 19B:
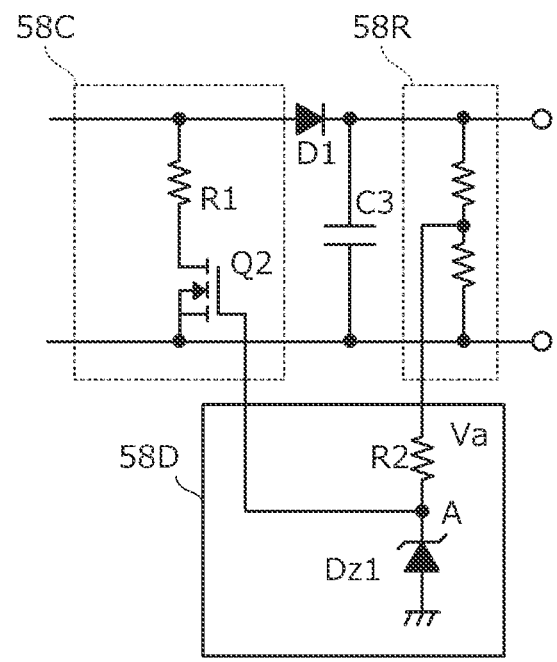

FIGS. 19A and 19B are diagrams illustrating configuration examples of the received voltage detection circuit 58D illustrated in FIG. 16.

In the example illustrated in FIG. 19A, the received voltage detection circuit 58D includes comparators 25A and 25B and a control unit 25C. The comparator 25A compares a received voltage Va with a threshold voltage Va1. The comparator 25A outputs an H level signal (H) when Va>Va1 is established, and the comparator 25A outputs an L level signal (L) when Va≤Va1 is established. The comparator 25B compares the received voltage Va with a threshold voltage Va2. The comparator 25B outputs the H level signal (H) when Va>Va2 is established, and the comparator 25B outputs the L level signal (L) when Va≤Va2 is established.

The control unit 25C outputs a gate signal to the FET Q2 based on output signals of the comparators 25A and 25B. In detail, when both of the output signals of the comparators 25A and 25B are L, namely, when Va<Va1 is established, the control unit 25C turns off the FET Q2. When the output signal of the comparator 25A is H and the output signal of the comparator 25B is L, namely, when Va1<Va<Va2 is established, the control unit 25C outputs a pulse signal to a gate of the FET Q2 so as to turn on and off the FET Q2. When both of the output signals of the comparators 25A and 25B are H, namely, when Va2<Va is established, the control unit 25C turns on the FET Q2.

In the example illustrated in FIG. 19B, the cutoff circuit 58C includes the resistance R1 for supplying current to the FET Q2.

The cutoff circuit 58C illustrated in FIG. 19B includes the resistance R1 and the FET Q2. The received voltage detection circuit 58D includes a series circuit composed of the resistance R2 and a Zener diode Dz1. A connection point A between the resistance R2 and the Zener diode Dz1 is connected to the gate of the FET Q2.

When the received voltage Va is lower than the Zener voltage of the Zener diode Dz1 in this configuration, a potential of the connection point A is L and the FET Q2 is off. When the received voltage Va that is a resistance divided voltage of the resistance voltage dividing circuit 58R exceeds the Zener voltage, the potential of the connection point A becomes H and the FET Q2 is turned on. The Zener voltage is set so that the FET Q2 is shifted to the off state when the received voltage Va is equal to or lower than the threshold voltage Va1.

When the received voltage Va exceeds the Zener voltage and the FET Q2 is turned on, a power reception cutoff state starts. Accordingly, the capacitor C3 discharges and the received voltage Va is lowered. When the received voltage Va becomes to be lower than the Zener voltage, the potential of the connection point A becomes L and the FET Q2 is turned off again. Then, when the received voltage Va exceeds the Zener voltage again, the FET Q2 is turned on. This process is repeated and excessive received voltage is suppressed.

When the received voltage Va is higher than a specified value, the FET Q2 is turned on and the power reception cutoff state starts. The cutoff circuit 58C maintains the cutoff state and power reception is stopped until the received voltage Va becomes to be lower than the Zener voltage.

Figure 20:
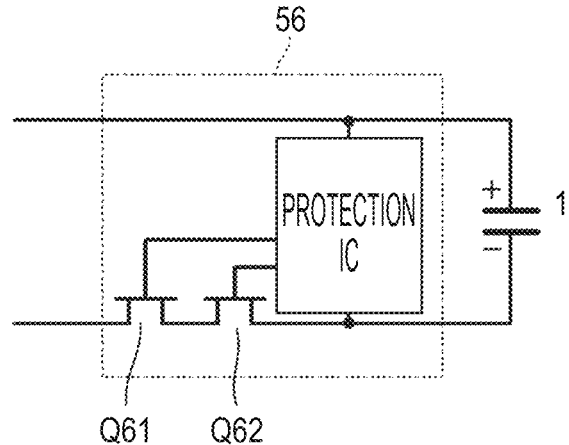
FIG. 20 is a circuit diagram illustrating a specific example of a protection circuit.

FIG. 20 is a circuit diagram illustrating a specific example of the protection circuit 56. The protection circuit 56 is composed of a protection IC 60 and FETs Q61 and Q62. The protection IC 60 detects both end voltages of the solid-state battery 1. When an applied voltage of the solid-state battery 1 exceeds a prescribed voltage, the protection IC 60 controls gate voltages of the FETs Q61 and Q62 and cuts off a charging current path to the solid-state battery 1.

Eighth Embodiment

An eighth embodiment will describe an example of a circuit that cuts off power reception by controlling a rectifying element.

Figure 21:
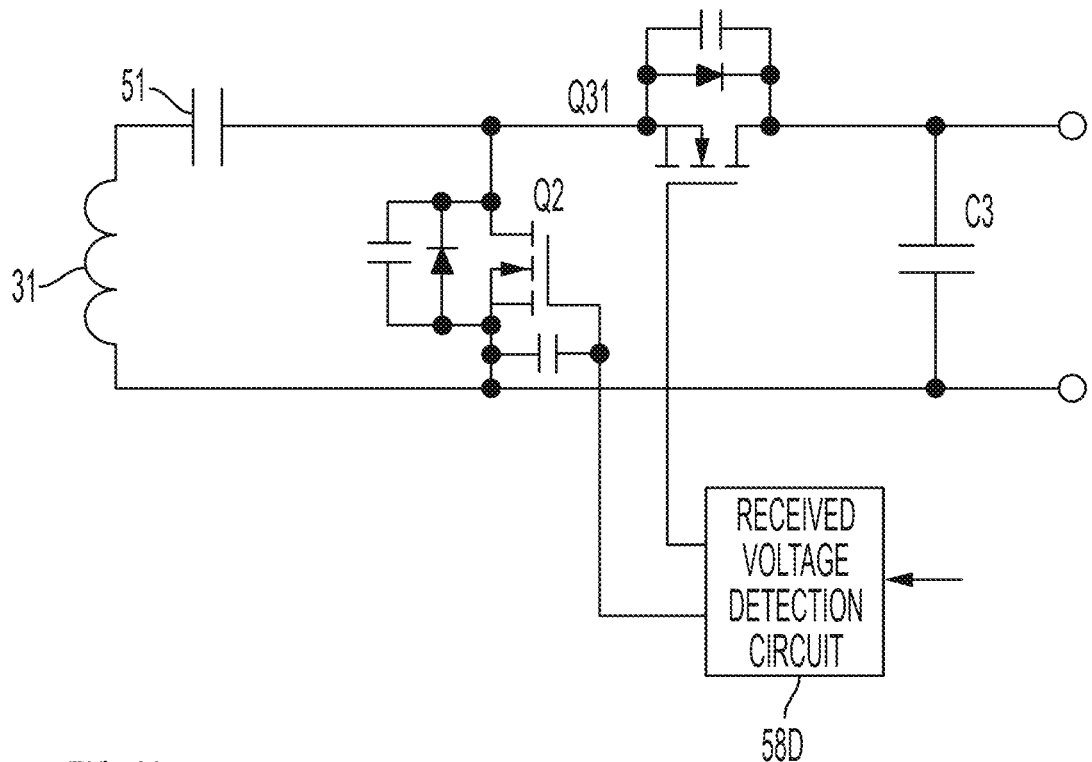
FIG. 21 is a diagram illustrating a configuration of a cutoff circuit of a wireless rechargeable solid-state battery module according to an eighth embodiment.
Figure 22:
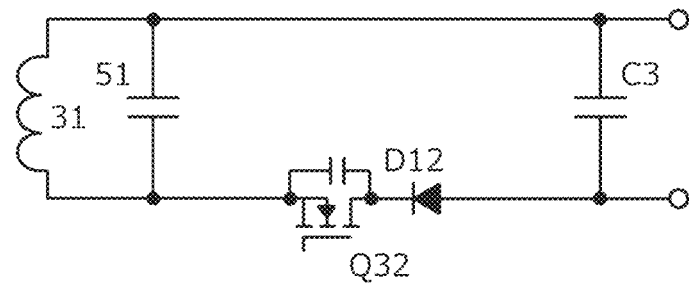
FIG. 22 is a diagram illustrating a configuration of a cutoff circuit of another wireless rechargeable solid-state battery module according to the eighth embodiment.

FIG. 21 and FIG. 22 are diagrams illustrating configurations of a cutoff circuit of a wireless rechargeable solid-state battery module according to the eighth embodiment. In FIG. 21, the FET Q2 and a FET Q31 constitute a synchronous rectifier circuit. The received voltage detection circuit 58D controls the FETs Q2 and Q31 so as to control a synchronous rectification operation. That is, in conducting power reception cutoff, the FET Q2 is shifted to the on state and the FET Q31 is shifted to the off state.

In FIG. 22, a FET Q32 and a diode D12 constitute a rectifier circuit. The received voltage detection circuit 58D controls the FET Q32 so as to control a rectification operation. That is, in conducting power reception cutoff, the FET Q32 is shifted to the off state.

Ninth Embodiment

A ninth embodiment will describe a configuration example of a power reception protection circuit provided with a bridge rectifier circuit.

Figure 23:
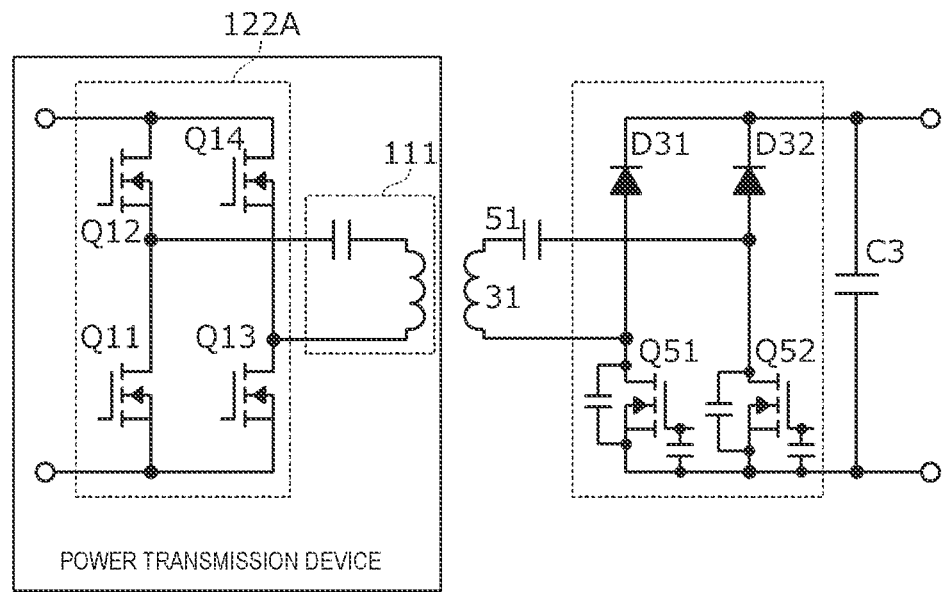
FIG. 23 is a circuit diagram partially illustrating a wireless rechargeable solid-state battery module and a power transmission device according to a ninth embodiment.
Figure 24:
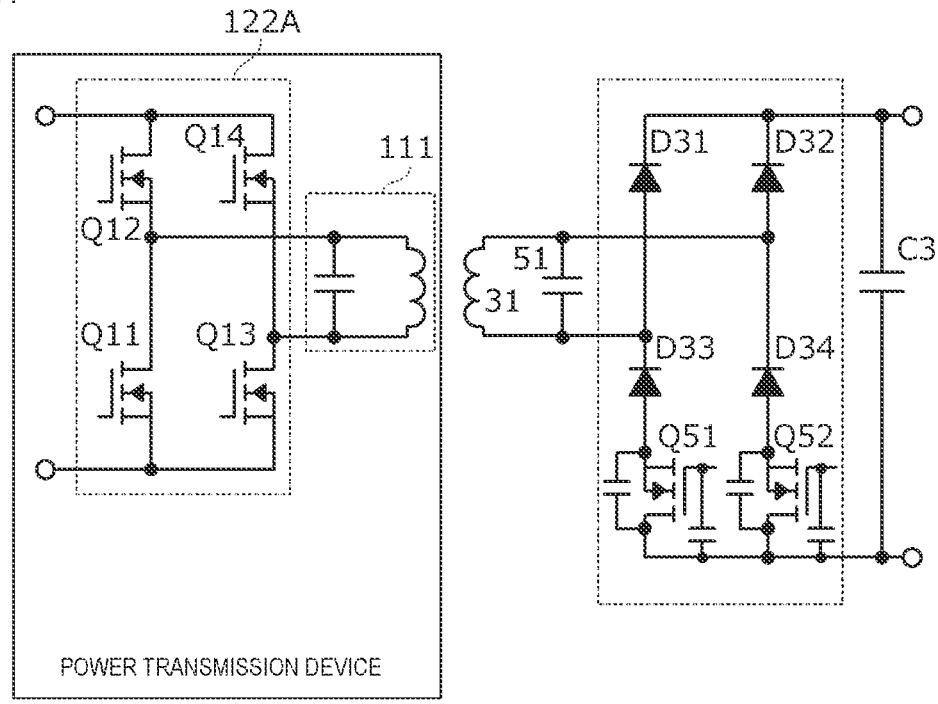
FIG. 24 is a circuit diagram partially illustrating another wireless rechargeable solid-state battery module and a power transmission device according to the ninth embodiment.

FIG. 23 and FIG. 24 are circuit diagrams partially illustrating a wireless rechargeable solid-state battery module and a power transmission device according to the ninth embodiment.

Referring to FIG. 23, the power transmission device includes a power transmission-side resonant circuit 111 and a power transmission circuit 122A. The power transmission circuit 122A is configured in a manner such that a series circuit composed of FETs Q11 and Q12 and a series circuit composed of FETs Q13 and Q14 are connected in parallel. A DC voltage from a DC power supply is converted into an AC voltage by alternately turning on and off the FETs Q11 and Q14 and the FETs Q12 and Q13 and the AC voltage is supplied to the power transmission-side resonant circuit 111.

In FIG. 23, a rectifier circuit is configured in a manner such that a series circuit composed of a FET Q51 and a diode D31 and a series circuit composed of a FET Q52 and a diode D32 are connected in parallel. The received voltage detection circuit 58D (FIG. 16) performs switching control with respect to the FETs Q51 and Q52.

Referring to FIG. 24, a diode bridge rectifier circuit composed of diodes D31, D32, D33, and D34 and the FETs Q51 and Q52 are provided. This configuration is different from the example illustrated in FIG. 23 in the directions of drains and sources of the FETs Q51 and Q52.

In either of the examples illustrated in FIGS. 22 and 23, the FETs Q51 and Q52 are shifted to the off state and rectification by the diodes D31, D32, D33, and D34 is blocked in conducting power reception cutoff.

Finally, the description of the embodiments described above is exemplary in all aspects and not restrictive. Those skilled in the art can appropriately make modifications and changes. The scope of the present disclosure is indicated by the claims rather than the embodiments described above. Further, the scope of the present disclosure includes changes from the embodiments within the scope equivalent to the scope of the claims.

What is claimed is:

1. A wireless rechargeable solid-state battery module comprising:
   a solid-state battery;
   an internal structure including an internal circuit electrically connected with the solid-state battery;
   a positive electrode terminal and a negative electrode terminal, each of which is electrically connected with the solid-state battery, is exposed on an outer surface, and is arranged on a position where the positive electrode terminal or the negative electrode terminal can be mounted on an electronic circuit board;
   a barrier layer that entirely or partially contains a conductor and isolates the solid-state battery and the internal structure from an outside air environment; and
   a power receiving terminal that is electrically connected with an external circuit, the external circuit including a power receiving coil coupled with an external electromagnetic or magnetic field, is electrically connected with the internal circuit, and is in an outside of the barrier layer, wherein
   the power receiving coil is configured to convert the external electromagnetic or magnetic field into electrical energy and supply current to the internal circuit via the power receiving terminal, and
   the internal circuit includes a charging circuit configured to charge the solid-state battery and a discharging circuit that is configured to discharge to a load to which the positive electrode terminal and the negative electrode terminal are connected.

2. The wireless rechargeable solid-state battery module according to claim 1, wherein
   the solid-state battery is an all-solid-state battery.

3. The wireless rechargeable solid-state battery module according to claim 1, wherein
   the internal structure includes a circuit board on which the solid-state battery is mounted, and a resin portion that molds a periphery of the solid-state battery,
   the barrier layer includes a first barrier layer that is on a periphery of the resin portion and a second barrier layer that is on the circuit board, and
   the circuit board has a path that electrically connects the internal circuit with the positive electrode terminal, the negative electrode terminal, and the power receiving terminal.

4. The wireless rechargeable solid-state battery module according to claim 3, wherein
   the first barrier layer includes a film configured by brazing with a metal sealing material.

5. The wireless rechargeable solid-state battery module according to claim 3, wherein
   the second barrier layer includes a coating film including a nitride film or an oxide film.

6. The wireless rechargeable solid-state battery module according to claim 3, wherein a buffer layer is interposed between the first barrier layer and the internal structure or between the second barrier layer and the internal structure.

7. The wireless rechargeable solid-state battery module according to claim 1, wherein
the discharging circuit includes an output voltage stabilization circuit that is connected between the solid-state battery and the positive electrode terminal and between the solid-state battery and the negative electrode terminal and is configured to stabilize a discharging voltage of the solid-state battery.

8. The wireless rechargeable solid-state battery module according to claim 1, wherein
the internal circuit includes a protection circuit that is configured to perform protection against at least one of overcurrent, overvoltage, and overheat in charging/discharging of the solid-state battery.

9. The wireless rechargeable solid-state battery module according to claim 1, further comprising:
an impact absorbing member that molds a periphery of the solid-state battery.

10. The wireless rechargeable solid-state battery module according to claim 1, wherein
the charging circuit includes:
a rectifier circuit configured to rectify induced current of the power receiving coil, the induced current being inputted into the power receiving terminal;
a voltage conversion circuit that is configured to convert an output voltage of the rectifier circuit so as to generate a charging voltage; and
a charge control circuit that is configured to input an output voltage of the voltage conversion circuit so as to perform charging control of the solid-state battery.

11. The wireless rechargeable solid-state battery module according to claim 10, wherein
the charging circuit includes a resonant capacitor that configures a resonant circuit together with the power receiving coil connected with the power receiving terminal.

12. The wireless rechargeable solid-state battery module according to claim 10, wherein
the charging circuit include a smoothing circuit on a subsequent stage of the rectifier circuit.

13. A wireless power supply module comprising:
the wireless rechargeable solid-state battery module according to claim 1; and
the external circuit that is connected with the power receiving terminal of the wireless rechargeable solid-state battery module.

14. The wireless power supply module according to claim 13, wherein
the power receiving coil is a conductor pattern on the electronic circuit board or a coil component connected to the electronic circuit board.

15. A wireless power supply module comprising:
the wireless rechargeable solid-state battery module according to claim 1;
the power receiving coil that is provided in an outside of the wireless rechargeable solid-state battery module; and
a rectifier circuit that is configured to rectify induced current of the power receiving coil, wherein the charging circuit includes a voltage conversion circuit configured to convert an output voltage of the rectifier circuit so as to generate a charging voltage, and a charge control circuit configured to input an output voltage of the voltage conversion circuit so as to perform charging control of the solid-state battery.

16. The wireless power supply module according to claim 15, further comprising:
a resonant capacitor that is in the outside of the wireless rechargeable solid-state battery module and configures a resonant circuit together with the power receiving coil connected with the power receiving terminal.

17. The wireless power supply module according to claim 15, further comprising:
a smoothing circuit that is in the outside of the wireless rechargeable solid-state battery module and is on a subsequent stage of the rectifier circuit.

18. The wireless rechargeable solid-state battery module according to claim 2, wherein
the internal structure includes a circuit board on which the solid-state battery is mounted, and a resin portion that molds a periphery of the solid-state battery,
the barrier layer includes a first barrier layer that is on a periphery of the resin portion and a second barrier layer that is on the circuit board, and
the circuit board has a path that electrically connects the internal circuit with the positive electrode terminal, the negative electrode terminal, and the power receiving terminal.

19. The wireless rechargeable solid-state battery module according to claim 4, wherein
the second barrier layer includes a coating film including a nitride film or an oxide film.

20. The wireless rechargeable solid-state battery module according to claim 4, wherein
a buffer layer is interposed between the first barrier layer and the internal structure or between the second barrier layer and the internal structure.

21. The wireless rechargeable solid-state battery module according to claim 1, wherein
the internal structure includes a circuit board on which the solid-state battery is mounted, and
the barrier layer is on an upper side of the circuit board on which the solid-state battery is mounted.

22. The wireless rechargeable solid-state battery module according to claim 1, wherein
the internal structure includes a circuit board on which the solid-state battery is mounted, and
the barrier layer is on an underside of the circuit board on which the solid-state battery is mounted.

23. The wireless rechargeable solid-state battery module according to claim 1, wherein
the internal structure includes a circuit board on which the solid-state battery is mounted, and
the barrier layer is on both sides of the circuit board on which the solid-state battery is mounted.

* * * * *